United States Patent
Wang

(10) Patent No.: US 9,426,462 B2
(45) Date of Patent: *Aug. 23, 2016

(54) INDICATION AND ACTIVATION OF PARAMETER SETS FOR VIDEO CODING

(71) Applicant: QUALCOMM Incorporated, San Diego, CA (US)

(72) Inventor: Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 13/964,599

(22) Filed: Aug. 12, 2013

(65) Prior Publication Data

US 2014/0086317 A1  Mar. 27, 2014

Related U.S. Application Data

(60) Provisional application No. 61/704,214, filed on Sep. 21, 2012.

(51) Int. Cl.
*H04N 19/50* (2014.01)
*H04N 19/70* (2014.01)
*H04N 19/46* (2014.01)
*H04N 19/30* (2014.01)

(52) U.S. Cl.
CPC ........ *H04N 19/00569* (2013.01); *H04N 19/30* (2014.11); *H04N 19/46* (2014.11); *H04N 19/50* (2014.11); *H04N 19/70* (2014.11)

(58) Field of Classification Search
USPC ........................................ 375/240.01–240.29
See application file for complete search history.

(56) References Cited

U.S. PATENT DOCUMENTS

| 8,233,547 B2 | 7/2012 | Winger |
| 8,238,439 B2 | 8/2012 | Pandit et al. |
| 8,306,112 B2 | 11/2012 | Sekiguchi et al. |
| 8,767,840 B2 | 7/2014 | Chuang |
| 2004/0005007 A1 | 1/2004 | Viscito et al. |
| 2005/0259147 A1 | 11/2005 | Nam et al. |
| 2006/0062300 A1 | 3/2006 | Park et al. |
| 2007/0177812 A1 | 8/2007 | Yang |
| 2007/0230564 A1 | 10/2007 | Chen et al. |
| 2007/0274393 A1 | 11/2007 | Toma et al. |

(Continued)

FOREIGN PATENT DOCUMENTS

| TW | 201225675 A | 6/2012 |
| WO | 2013002709 A1 | 1/2013 |

OTHER PUBLICATIONS

Office Action and Search Report including translation from Taiwan Application Serial No. 102130901 dated Mar. 20, 2015 (16 pages).

(Continued)

*Primary Examiner* — Leron Beck
(74) *Attorney, Agent, or Firm* — Shumaker & Sieffert, P.A.

(57) ABSTRACT

In some examples, a video encoder includes multiple sequence parameter set (SPS) IDs in an SEI message, such that multiple active SPSs can be indicated to a video decoder. In some examples, a video decoder activates a video parameter set (VPS) and/or one or more SPSs through referencing an SEI message, e.g., based on the inclusion of the VPS ID and one or more SPS IDs in the SEI message. The SEI message may be, as examples, an active parameter sets SEI message or a buffering period SEI message.

21 Claims, 8 Drawing Sheets

(56) References Cited

U.S. PATENT DOCUMENTS

| | | |
|---|---|---|
| 2008/0089428 A1 | 4/2008 | Nakamura et al. |
| 2008/0095228 A1 | 4/2008 | Hannuksela et al. |
| 2008/0095246 A1 | 4/2008 | Luo et al. |
| 2008/0144724 A1 | 6/2008 | Luo et al. |
| 2008/0192646 A1 | 8/2008 | Song et al. |
| 2008/0205513 A1 | 8/2008 | Xiong et al. |
| 2008/0285863 A1 | 11/2008 | Moon et al. |
| 2009/0006927 A1 | 1/2009 | Sayadi et al. |
| 2009/0080535 A1 | 3/2009 | Yin et al. |
| 2009/0168680 A1 | 7/2009 | Singh et al. |
| 2010/0020884 A1 | 1/2010 | Pandit et al. |
| 2010/0027615 A1 | 2/2010 | Pandit et al. |
| 2010/0046635 A1 | 2/2010 | Pandit et al. |
| 2010/0091881 A1 | 4/2010 | Pandit et al. |
| 2010/0118942 A1 | 5/2010 | Pandit et al. |
| 2010/0142613 A1 | 6/2010 | Zhu |
| 2010/0161692 A1 | 6/2010 | Visharam et al. |
| 2010/0189182 A1 | 7/2010 | Hannuksela |
| 2010/0195738 A1 | 8/2010 | Zhu et al. |
| 2010/0205498 A1 | 8/2010 | Chuang |
| 2010/0284466 A1 | 11/2010 | Pandit et al. |
| 2011/0298895 A1 | 12/2011 | Tian et al. |
| 2012/0121014 A1 | 5/2012 | Rusert et al. |
| 2012/0144433 A1 | 6/2012 | Won et al. |
| 2012/0269275 A1 | 10/2012 | Hannuksela |
| 2013/0089154 A1 | 4/2013 | Chen et al. |
| 2013/0100248 A1 | 4/2013 | Kadono |
| 2013/0114694 A1 | 5/2013 | Chen et al. |
| 2014/0003489 A1* | 1/2014 | Hannuksela ............ H04N 19/70 375/240.02 |
| 2014/0086337 A1 | 3/2014 | Wang |
| 2015/0131743 A1 | 5/2015 | Zhu et al. |
| 2015/0281736 A1 | 10/2015 | Pandit et al. |

OTHER PUBLICATIONS

International Search Report and Written Opinion—PCT/US2013/054983—ISA/EPO—Apr. 24, 2014, 16 pp.
International Preliminary Report on Patentability from International Application No. PCT/US2013/054983, dated Nov. 7, 2014, 8 pp.
Suzuki, "Text of ISO/IEC 14496-10:2012/PDAM2 MVC extension for inclusion of depth maps", MPEG Meeting, Apr. 30, 2012-May 4, 2012, Geneva, Motion Picture Expert Group or ISO/IEC JTC1/SC29/WG11, No. N12731, XP030019204, 44 pp.
Boyce, et al., "SEI message for sub-bitstream profile & level indicators", JCT-VC Meeting; MPEG Meeting; Apr. 27, 2012-May 7, 2012; Genev.(Joint Collaborative Team on Video Coding of ISO/IEC JTC1/SC29/WG11 and ITU-T SG.16 ); URL: http:// wftp3 .itu .i nt/ a v -arch/jctvc-site/, No. JCTVC-I0231, XP030111994, 7 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross, et al., "Proposed Editorial Improvements for High efficiency video coding (HEVC) Text Specification Draft 8", JCT-VC Meeting; MPEG Meeting; Oct. 10, 2012-Oct. 19, 2012; Shanghai ; (Joint Collaborative Team on Video Coding of ISO/IEC JTC1/SC29/WG11 and ITU-T SG. 16 ); URL: http://wftp3.itu.int/av-archi/jctvc-site/, No. JCTVC-K0030v1, XP002722601, 41 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Hannuksela "AHG10 Hooks for Scalable Coding: Sequence Parameter Set Design" , JCT-VC Meeting; MPEG Meeting; Jul. 11, 2012-Jul. 20, 2012; Stockholm; (Joint Collaborative Team on Video Coding of ISO/IEC JTC/SC29/WG11 and ITU-T SG. 16 ); URL: http://wftp3.itu.int/av-arch/jctvc-site/, No. JCTVC-J0074, XP030112436, 11 pp.
International Search Report and Written Opinion—PCT/US2013/054980—ISA/EPO—Apr. 27, 2014, 14 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Rusert, "3D-HEVC HLS: Inter-layer SPS Prediction", JCT-3V Meeting; MPEG Meeting; Jul. 16, 2012-Jul. 20, 2012; Stockholm; (The Joint Collaborative Team on 3D Video Coding Extension Development of ISO/IECJTC1/SC29/WG11 and ITU-T SG.16) URL: http://phenix.int-evry. fr/jct2/, No. JCT3V-A0021, XP030130020, 6 pp.
Schwarz, et al., "Description of 3D Video Coding Technology Proposal by Fraunhofer HHI (HEVC compatible; configuration A)", MPEG Meeting; Nov. 28, 2011-Dec. 2, 2011; Geneva; (Motion Picture Expert Group or ISO/IEC JTC1/SC29/WG11), No. m22570, XP030051133, 46 pp.
Schwarz, et al., "Description of 3D Video Technology Proposal by Fraunhofer HHI (HEVC compatible, configuration B)", MPEG Meeting; Nov. 28, 2011-Dec. 2, 2011; Geneva; (Motion Picture Expert Group or ISO/IEC JTC1/SC29/WG11), No. m22571, XP030051134; 46 pp.
Schwarz, et al., "Test Model under Consideration for HEVC based 3D video coding," ISO/IEC JTC1/SC29/WG11 MPEG2011/N12559 Feb. 2012 San Jose, CA USA, 44 pp.
Sjoberg, et al., "Overview of HEVC High-Level Syntax and Reference Picture Management," IEEE Transactions on Circuits and Systems for Video Technology, vol. 22 (12), Dec. 2012, pp. 1858-1870.
Thang, et al., " AHG9: Signaling of VPS Activation", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITUI-T SG. 16 ); URL: http://wftp3.itu.int/av-arch/jctvc-site/, No. JCTVC-J026r1, XP002722600, 4 pp.
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
Borman, et al., RTP Payload Format for the 1998 Version of ITU-T Rec. H.263 Video (H.263+), Network Working Group, RFC 2429, Oct. 1998, 15 pp.
Bross et al., "High efficiency video coding (HEVC) text specification draft 10 (for FDIS & Last Call)," 12th Meeting: Geneva, CH, Jan. 14-23, 2013, JCTVC-L1003_v18, 331 pp.
ITU-T H.264, Series H: Audiovisual and Multimedia Systems, Infrastructure of audiovisual services—Coding of moving video, Advanced video coding for generic audiovisual services, The International Telecommunication Union. Mar. 2005, 343 pp.
Second Written Opinion from International Application No. PCT/US2013/054980, dated Nov. 4, 2014, 9 pp.

(56) References Cited

OTHER PUBLICATIONS

International Preliminary Report on Patentability from corresponding PCT Application Serial No. PCT/US2013/054980, dated Feb. 24, 2015 (9 page).
Office Action from U.S. Appl. No. 13/964,688 dated Nov. 6, 2015 (42 pages).
Taiwan Office Action and Search Report from related Application Serial No. 102130900 dated Aug. 13, 2015, 21 pp.
Amendment in response to the Office Action dated Nov. 6, 2015 for U.S. Appl. No. 13/964,688, filed Feb. 8, 2016 (21 pages).
Office Action from U.S. Appl. No. 13/964,688 dated Mar. 7, 2016 (41 pages).
Amendment in response to Office Action mailed Mar. 7, 2016 from U.S. Appl. No. 13/964,688, filed Jun. 7, 2016 (23 pages).

* cited by examiner

006
INDICATION AND ACTIVATION OF PARAMETER SETS FOR VIDEO CODING

This application claims the benefit of U.S. Provisional Application Ser. No. 61/704,214, filed Sep. 21, 2012, the entire content of which is incorporated herein by reference.

TECHNICAL FIELD

This disclosure relates to video coding and, more particularly, to parameter sets used in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC) (H.264/AVC), the High Efficiency Video Coding (HEVC) standard presently under development, and extensions of such standards. H.264/AVC has, as examples, Scalable Video Coding (SVC) and Multiview Video Coding (MVC) extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for indicating which parameter sets are active for video coding and, in some examples, to support activation of such parameter sets. In some examples, a video encoder includes multiple sequence parameter set (SPS) identifiers (IDs) in an SEI message, e.g., an active parameter sets SEI message or a buffering period SEI message, such that multiple active SPSs can be indicated to a video decoder. In some examples, a video decoder activates a video parameter set (VPS) and/or one or more SPSs through referencing an SEI message, e.g., based on the inclusion of the VPS ID and one or more SPS IDs in the SEI message. The SEI message may be, for example, an active parameter sets SEI message of buffering period SEI message.

In one example, a method of decoding video data comprises decoding a bitstream that includes video data and syntax information for decoding the video data, wherein the syntax information comprises a supplemental enhancement information (SEI) message of an access unit, and wherein the SEI message indicates a plurality of sequence parameter sets (SPSs) and a video parameter set (VPS) for decoding video data of the access unit. The method further comprises decoding the video data of the access unit based on the plurality of SPSs and the VPS indicated in the SEI message.

In another example, a method of encoding video data comprises encoding a bitstream that includes video data and syntax information for encoding the video data, wherein the syntax information comprises a supplemental enhancement information (SEI) message of an access unit, and wherein the SEI message indicates a plurality of sequence parameter sets (SPSs) and a video parameter set (VPS) for decoding video data of the access unit. The method further comprises encoding the video data of the access unit based on the plurality of SPSs and the VPS indicated in the SEI message.

In another example, a device comprises a video decoder configured to decode a bitstream that includes video data and syntax information for decoding the video data, wherein the syntax information comprises a supplemental enhancement information (SEI) message of an access unit, and wherein the SEI message indicates a plurality of sequence parameter sets (SPSs) and a video parameter set (VPS) for decoding video data of the access unit. The video decoder is further configured to decode the video data of the access unit based on the plurality of SPSs and the VPS indicated in the SEI message.

In another example, a device comprises a video encoder configured to encode a bitstream that includes video data and syntax information for encoding the video data, wherein the syntax information comprises a supplemental enhancement information (SEI) message of an access unit, and wherein the SEI message indicates a plurality of sequence parameter sets (SPSs) and a video parameter set (VPS) for decoding video data of the access unit. The video encoder is further configured to encode the video data of the access unit based on the plurality of SPSs and the VPS indicated in the SEI message.

In another example, a device comprises means for coding a bitstream that includes video data and syntax information for coding the video data, wherein the syntax information comprises a supplemental enhancement information (SEI) message of an access unit, and wherein the SEI message indicates a plurality of sequence parameter sets (SPSs) and a video parameter set (VPS) for coding video data of the access unit. The device further comprises means for coding the video data of the access unit based on the plurality of SPSs and the VPS indicated in the SEI message.

In another example, a computer-readable storage medium has instructions stored thereon that, when executed by one or more processors of a video coder, cause the video coder to code a bitstream that includes video data and syntax information for coding the video data, wherein the syntax information comprises a supplemental enhancement information (SEI) message of an access unit, and wherein the SEI message indicates a plurality of sequence parameter sets (SPSs) and a video parameter set (VPS) for coding video data of the access unit. The instructions further cause the video coder to code the video data of the access unit based on the plurality of SPSs and the VPS indicated in the SEI message.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
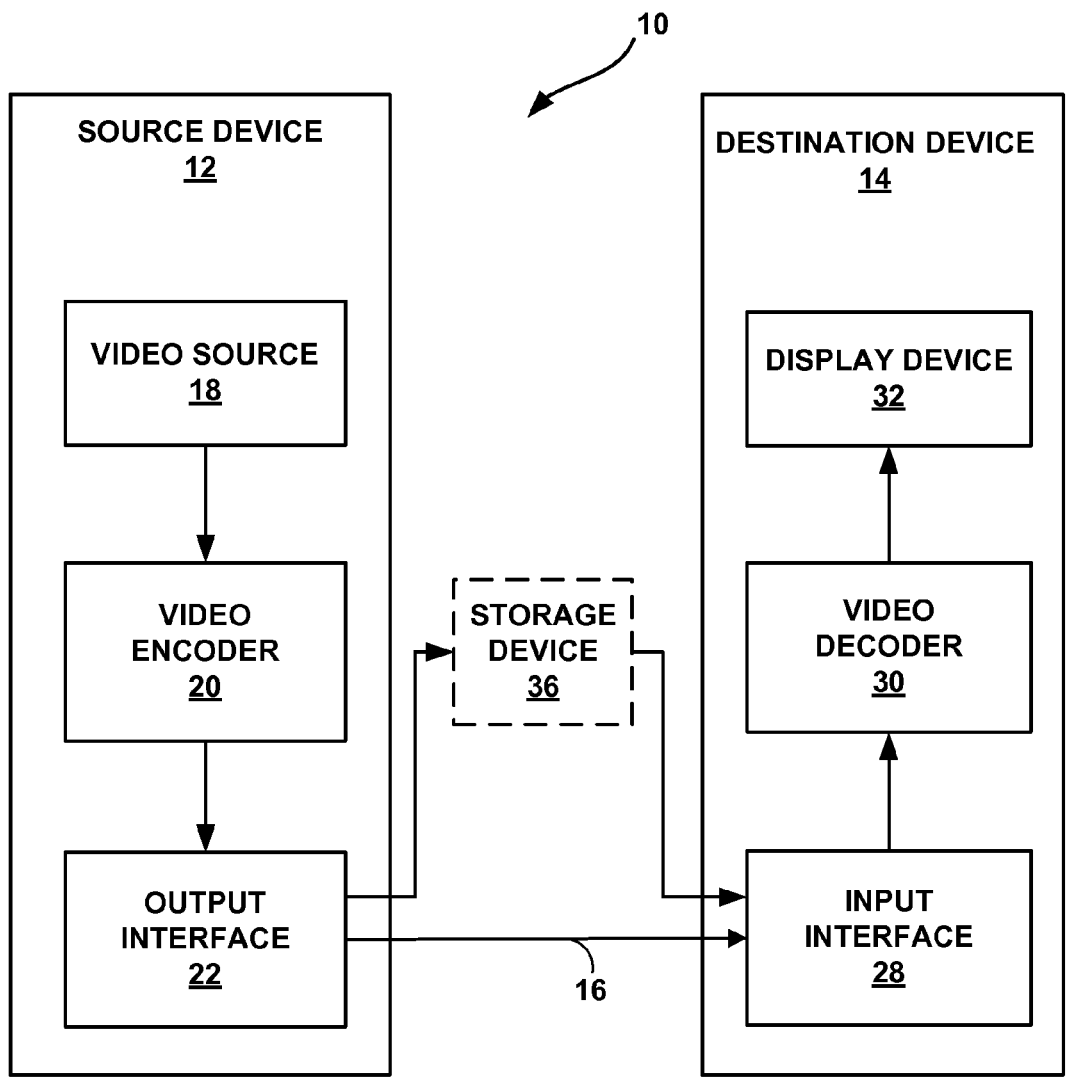
FIG. 1 is a block diagram illustrating an example video encoding and decoding system that may utilize the techniques for indicating active parameter sets and activating parameter sets described in this disclosure.

In general, this disclosure describes techniques for indicating which parameter sets are active for video coding and, in some examples, to support activation of such parameter sets. In some examples, a video encoder includes multiple sequence parameter set (SPS) identifiers (IDs) in an SEI message, e.g., an active parameter sets SEI message or a buffering period SEI message, such that multiple active SPSs can be indicated to a video decoder. In some examples, coded video data may comprise a plurality of layers and/or views, and each of the SPSs may be used for coding, e.g., encoding or decoding, a respective one or more of the layers and/or views. In some examples in which the active SPSs are associated with respective layers, the active SPSs may be referred to as active layer SPSs. Inclusion of multiple SPS IDs in an SEI message may facilitate multiview, 3D video (3DV) and/or scalable video coding.

In some examples, a video decoder activates a video parameter set (VPS) and/or one or more SPSs through referencing an SEI message, e.g., based on the inclusion of the VPS ID and one or more SPS IDs in the SEI message. The SEI message may be, for example, an active parameter sets SEI message. In such examples, the active parameter sets SEI message provided by a video encoder not only indicates the active VPS and the one or more active SPSs, but also causes a video decoder to activate them for decoding video data.

In other examples, the encoder may not provide an active parameter sets SEI message, and instead may include a VPS ID in the buffering period SEI message (which may already include a single SPS ID according to present HEVC specification) as the first syntax element. In such examples, the video encoder may include multiple SPS IDs in the buffering period SEI message, and the video decoder may activate the VPS and the one or more SPSs through referencing the buffering period SEI message. Again, the coded video data may comprise a plurality of layers and/or views, and each of a plurality of SPSs may be used for coding, e.g., encoding or decoding, a respective one or more of the layers and/or views. In such examples, activation of multiple SPSs through referencing an SEI message, e.g., by a video decoder, may facilitate multiview, 3DV and/or scalable video coding.

The techniques of the present disclosure may be implemented in video coders, e.g., video encoders and video decoders, that operate according to any of a variety of video coding standards. For example, the techniques of this disclosure may be implemented in video coders that operate according to the HEVC standard presently under development, which may also be referred to as H.265. The HEVC standard may also be referred to as ISO/IEC 23008-HEVC, which is intended to be the standard number for the delivered version of HEVC. The standardization efforts are based on a model of a video coding device referred to as the HEVC Test Model (HM). The HM presumes several different capabilities of video coding devices relative to devices operating according to previous coding standards, such as ITU-T H.264/AVC. For example, whereas H.264 provides nine intra-prediction encoding modes, HM provides as many as thirty-five intra-prediction encoding modes.

A recent working Draft (WD) of HEVC, referred to as "HEVC Working Draft 6" or "WD6," is described in document JCTVC-H1003, Bross et al., "High-Efficiency Video Coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February 2012, which is incorporated herein by reference in its entirety, and which as of May 13, 2013, is downloadable from: http://phenix.int-evry.fr/jct/doc_end_user/documents/8_San%20Jose/wg11/JCTVC-H1003-v22.zip Further, another recent working draft of HEVC, Working Draft 8, referred to as "HEVC Working Draft 8" or "WD8," is described in document HCTVC-J1003_d7, Bross et al., "High Efficiency Video Coding (HEVC) Text Specification draft 8," JCT-VC of ITU-T SG16 WP3 and ISO/IEC JTC1/SC29/WG11, 10th Meeting: Stockholm, Sweden, July, 2012, which is incorporated herein by reference in its entirety, and which as of May 13, 2013, is downloadable from: http://phenix.int-evey.fr/jct/doc_end_user/documents/10_Stockholm/wg11/JCTVC-J1003-v8.zip.

The HEVC standard continues to evolve, and a newer draft of the standard referred to as "HEVC Working Draft 10," or "WD10," is described in document JCTVC- L1003_v18, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, 14-23 Jan. 2013, which, as of May 13, 2013, is downloadable from http://phenix.it-sudparis.eu/jct/doc_end_user/documents/12_Geneva/wg11/JCTVC-L1003-v18.zip. The entire content of WD10 is hereby incorporated by reference.

H.264/AVC introduced the concept of parameter sets as a way to communicate syntax information that facilitates coding of digital video information from a video encoder to a video decoder. Parameter sets were introduced in H.264/AVC in response to the negative effects of a loss of the sequence header and picture header, if a picture is partitioned into multiple segments, e.g., slices, and those segments are transported in their own transport unit, e.g., real-time transport protocol (RTP) packet. Partitioning of a picture into segments that are transported in their own transport unit is desirable for maximum transfer unit (MTU) size matching. However, the loss of the first packet of a picture, which carries not only the first picture segment data, but also the picture header, and sometimes the group of pictures (GOP) and sequence header, might lead to an incorrect reconstruction of a picture, and sometimes also the following pictures, by a video decoder. In some cases, incorrect reconstruction may occur even if all other packets were not lost. Some video decoder implementations would not even attempt to decode the received packets of a picture, if the packet with the picture header was lost.

Prior to H.264/AVC, as an initial attempt to address this vulnerability, transport layer-based mechanisms were introduced. For example, the RTP payload format for H.263, specified in RFC 2429, allowed for carrying a redundant copy of the picture header in as many packets as chosen by the video encoder or packetizer. During the design of H.264/AVC, however, it was recognized that the vulnerability caused by inclusion of syntax information in the picture header is an architectural issue of the video codec itself, rather than a transport problem. In response to this realization, parameter sets were introduced in H.264/AVC as a way to communicate syntax information.

A parameter set is a syntax structure that includes syntax elements that allow a video decoder to reconstruct encoded video. Different syntax elements are included within different parameter sets based on the frequency at which the syntax elements are expected to change. For example, a sequence parameter set (SPS) includes syntax elements that are expected to remain unchanged for a sequence of pictures, while a picture parameter set (PPS) includes syntax elements that may change from picture to picture for within a sequence.

A video encoder may generate and output parameter sets. A video decoder may receive the parameter sets, and use the parameter sets in the decoding of video data from an encoded bitstream. A video encoder may provide the parameter sets as part of the video bitstream, or through an out-of-band transmission using a reliable channel between the video encoder and decoder. In other examples, the parameter sets may be hard coded in the encoder and decoder.

A parameter set contains an identification ("ID"), which is referenced, directly or indirectly, from the slice header. For example, each SPS may include an SPS ID, and each PPS may include a PPS ID and references an SPS by additionally including an SPS ID. Further, each slice header may reference a PPS using a PPS ID. Accordingly, based on the PPS ID in the slice header, a video decoder may activate a PPS. The video decoder may also activate an SPS based on the SPS ID in the PPS. The concept of activation through referencing was introduced, among other reasons, because implicit activation by virtue of the position of the information in the bitstream (as common for other syntax elements of a video codec) is not available in the case of parameter sets received by a video decoder via an out-of-band transmission.

Like H.264/AVC, HEVC utilizes parameter sets to communicate syntax information that facilitates coding of digital video information. However, HEVC introduces an additional parameter set, the video parameter set (VPS). Among other things, the VPS may be used to convey information that is applicable to multiple layers, as well as sub-layers, and/or multiple views. Accordingly, the VPS may facilitate coding video data that includes multiple layers, e.g., for scalable video coding, or multiple views, e.g., for multiview or 3D video coding. Each layer or view of a given video sequence may be, but is not necessarily, coded according to a respective SPS. However, each layer or view of a given video sequence, regardless of whether they have the same or different SPSs, refer to the same VPS.

H.264/AVC did not contain a parameter set comparable to the VPS, and instead required a complex modeling of the layering structure for purposes such as capability exchange and session negotiation. In the Scalable Video Coding (SVC) extension of H.264/AVC, the scalability information supplemental enhancement information (SEI) message offered approximately the same content as the VPS of HEVC. However, by its nature of being an SEI message, most of the same information in the scalability information SEI message had to be repeated in H.264/AVC SPSs, which in some application scenarios also needed to be transmitted out-of-band, and consequently caused increased initial delay, particularly when the retransmission was used to guarantee reliability of the out-of-band transmissions. In cases of broadcast and multicast with in-band transmission of parameter sets, such repetition of the same information led to significant overhead, as parameter sets needed to be repeated at each random access point for tuning in and channel switching. The VPS of HEVC may address these shortcomings, as well as enable a clean and extensible high-level design of multi-layer codecs.

Information that may be conveyed in a VPS includes, for example: (1) common syntax elements shared by multiple layers or operation points, in order to avoid unnecessary duplications; (2) essential information of operation points needed for session negotiation, including, e.g., profile and level; and (3) other operation point specific information, which does not belong to one SPS, e.g., hypothetical reference decoder (HRD) parameters for layers or sub-layers. The parsing of essential information of each operation point does not require variable length coding, and thus is considered lightweight for most network elements. It is expected that the VPS extension, which may be specified in HEVC extensions, may contain more syntax elements than those in the current VPS, for efficient parameter signaling, flexible and lightweight session negotiation as well as advanced bitstream adaptation, e.g., based on view identifier in a 3DV extension. According to the HEVC WD8, some information is duplicated between the VPS and the SPSs belonging to the layer. This duplication was introduced to allow a version 1 decoder to disregard the VPS network abstraction layer (NAL) unit and still have available all information required to decode the bitstream.

According to H.264/AVC, as well as in HEVC, SPSs contain information which applies to all slices of a coded video sequence, e.g., sequence of pictures. In HEVC, a coded video sequence starts from an instantaneous decoding refresh (IDR) picture, or a broken link access (BLA) picture, or a clean random access (CRA) picture that is the first picture in the bitstream. A coded video sequence includes all subsequent pictures that are not an IDR or BLA picture. A bitstream consists of one or more coded video sequences.

The content of the SPS can be roughly subdivided into six categories: (1) a self-reference, e.g., its own ID; (2) decoder operation point related information, e.g., profile, level, picture size, and number of sub-layers; (3) enabling flags for certain tools within a profile, and associated coding tool parameters in case the tool is enabled; (4) information restricting the flexibility of structures and transform coefficient coding; (5) temporal scalability control, which may be similar to H.264/SVC; and (6) Visual Usability Information (VUI), which includes HRD information.

The HEVC PPS contains such information which could change from picture to picture. The PPS includes information roughly comparable to what was part of the PPS in H.264/AVC, including (1) a self-reference, e.g., its own ID; (2) initial picture control information such as an initial quantization parameter (QP), a number of flags indicating the use of, or presence of, certain tools or control information in the slice header; and (3) tiling information.

The slice header contains information that can change from slice to slice, as well as such picture related information that is relatively small or relevant only for certain slice or picture types. The size of slice header may be noticeably bigger than the PPS, particularly when there are tile or wavefront entry point offsets in the slice header and reference picture selection, prediction weights, or reference picture list modifications are explicitly signaled.

Activation of parameter sets in HEVC is similar to H.264/AVC. The slice header contains a reference to PPS. The PPS, in turn, contains a reference to the SPS, and the SPS contains a reference to the VPS. One common implementation strategy for parameter sets is to keep all parameter sets of a given type (PPS, SPS and VPS) in tables, whose maximum size is indirectly specified by the numbering range of the parameter set IDs. Under such an implementation strategy, activation of a parameter set may be accomplished by: (1) accessing the PPS tables based on information, e.g., the PPS ID, in the slice header, and copying the information found for the PPS in the PPS tables into the relevant decoder data structures; (2) following the reference, e.g., the SPS ID, in the PPS to the relevant SPS in the SPS tables, and copying the information found for the SPS in the SPS tables into the relevant decoder data structures; and (3) following the reference, e.g., the VPS ID, in the SPS to the relevant VPS in the VPS tables, and copying the information found for the VPS in the VPS tables into the relevant decoder data structures. As these operations may need to be performed (at most) only once per picture, the operation may be considered lightweight.

According to proposals for the HEVC standard, the SPS may also be activated by being referenced in a buffering period SEI message. For activation of the SPS by being referenced in the buffering period SEI message, the buffering period SEI message may include the SPS ID of the SPS to be activated. Additionally, HEVC WD8 specifies an active parameter sets SEI message. According to HEVC WD8, the active parameter sets SEI message may indicate the currently-active VPS and the currently-active SPS, e.g., by inclusion of the VPS and SPS IDs for the currently active VPS and SPS. According to HEVC WD8, a video decoder does not activate the VPS and SPS by referencing in the active parameter sets SEI message. Instead, a video encoder includes the active parameter sets SEI message in the bitstream to indicate which parameter sets the video decoder should currently have active for decoding video data, and thereby allow the video decoder to confirm proper decoding operation.

As discussed above, a video encoder may provide the parameter sets to a video decoder as part of the video bitstream, or through an out-of-band transmission using a reliable channel between the video encoder and decoder. The video decoder may store the received parameter sets in data structures, e.g., respective tables for each parameter set type (PPS, SPS and VPS), retrieve the one or more of the parameter sets for each type from the tables when later activated by referencing, and load the retrieved parameter sets into respective decoding data structures for decoding the video data in the bitstream. In some examples, the video encoder may include the parameter sets in parameter set network abstraction layer (NAL) units.

The handling of the reception of a parameter set NAL unit, regardless of its type, may be straightforward, in that parameter set NAL units need not contain parsing dependencies, which means they are self-contained and do not require context derived from other NAL units for parsing. Although the generation of NAL units without parsing dependencies may cost a few more bits, it may enable straightforward parsing and storage of parameter sets in their respective table entries. Each type of parameter set may contain an extension mechanism, which may allow extending the parameter set in future versions of HEVC without breaking backward compatibility and without creating a parsing dependency to the profile/level information carried in the VPS and SPS.

Video coding standards generally include a specification of a video buffering model. In H.264/AVC and HEVC, the buffering model is referred to as the hypothetical reference decoder (HRD). The HRD includes a buffering model of both the coded picture buffer (CPB) and the decoded picture buffer (DPB), and mathematically specifies the CPB and DPB behaviors. The HRD directly imposes constraints on different timing, buffer sizes and bit rate, and indirectly imposes constraints on bitstream characteristics and statistics. A complete set of HRD parameters include five basic parameters, initial CPB removal delay, CPB size, bit rate, initial DPB output delay, and DPB size.

In H.264/AVC and HEVC, bitstream conformance and decoder conformance are specified as parts of the HRD specification. Though the name HRD suggests that the HRD is a decoder, the HRD is typically employed at the encoder side to guarantee bitstream conformance, and typically not needed at the decoder side. The HRD specifies two types of bitstream or HRD conformance—namely Type I and Type II. Also, the HRD specifies two types of decoder conformance—namely output timing decoder conformance and output order decoder conformance.

In the H.264/AVC and HEVC HRD models, decoding or CPB removal is access unit based, and it is assumed that picture decoding is instantaneous. In practical applications, if a conforming decoder strictly follows the decoding times signaled, e.g., in the picture timing SEI messages, to start decoding of access units, then the earliest possible time to output a particular decoded picture is equal to the decoding time of that particular picture plus the time needed for decoding that particular picture. The time needed for decoding a picture in practical applications cannot be equal to zero.

In HEVC WD8, the HRD is specified in Annex C. In HEVC WD8, the HRD relies on the HRD parameters. The HRD parameters can be provided in the bitstream in the hrd_parameters( ) syntax structure. The hrd_parameters( ) syntax structure may be included in, as examples, the VPS and/or the SPS, the buffering period SEI message, and the picture timing SEI message.

As discussed above, HEVC enables an SPS to be activated by a video decoder by being referenced, e.g., by its SPS ID, in the buffering period SEI message. In this manner, the buffering period SEI message enables an SPS to be activated independently of activation of a PPS via referencing in the slice header. HEVC WD8 also specifies an active parameter sets SEI message that enables a video encoder to indicate the active VPS and the active SPS to a video decoder. However, there are problems associated with these existing techniques for activation of parameter sets and indication of active parameter sets.

For example, in multiview, 3DV and/or scalable video coding extensions of HEVC, there may be multiple active SPSs at any given time. In particular, a video coder, e.g., a video encoder or video decoder, may code, e.g., encode or decode, the video data of some layers and/or views using different SPSs. In examples in which a video coder codes different layers according to different active SPSs, some of the active SPSs may be referred to as active layer SPSs. However, although the active parameter sets SEI message proposed for the HEVC standard can be used by a video encoder to indicate the active VPS and a single active SPS to a video decoder, it is currently not possible to indicate multiple active SPSs via the active parameter sets SEI message, or any other SEI message.

As another example, in HEVC WD8, while HRD parameters may be included in the VPS, the buffering period SEI message may contain a SPS ID but does not contain a VPS ID. Accordingly, in some cases, the HRD may initialize from an access unit that contains a buffering period SEI message, but at least some of the chosen HRD parameters for the HRD operation are included in the VPS, which, unlike the SPS, is not activated by the buffering period SEI. In such cases, the ability of a video decoder to parse some syntax elements in the buffering period SEI message would depend on information in the VPS. Accordingly, the video coder would need to indirectly activate the VPS subsequent to the SPS, based the reference to the VPS in the SPS that was activated from the buffering period SEI message. The need to subsequently and indirectly activate the VPS in such cases may be a computationally inefficient implementation of the video decoder.

This disclosure describes techniques for indicating which parameter sets are active for video coding and, in some examples, to support activation of such parameter sets, that may solve the above problems. In some examples, a video encoder includes multiple SPS IDs in an SEI message, e.g., an active parameter sets SEI message or a buffering period SEI message, such that multiple active SPSs can be indicated to a video decoder. In some examples, coded video data may comprise a plurality of layers and/or views, and each of the SPSs may be used for coding, e.g., encoding or decoding, a respective one or more of the layers and/or views. In some examples in which the active SPSs are associated with respective layers, the active SPSs may be referred to as active layer SPSs. Inclusion of multiple SPS IDs in an SEI message may facilitate more complete indication of active parameter sets for multiview, 3DV and/or scalable video coding.

In some examples, a video decoder activates a VPS and one or more SPSs through referencing an SEI message, e.g., based on the inclusion of the VPS ID and one or more SPS IDs in the SEI message. The SEI message may be, for example, an active parameter sets SEI message. In such examples, the active parameter sets SEI message provided in the bitstream by a video encoder not only indicates the active VPS and the one or more active SPSs, but also causes a video decoder to activate them for decoding video data of the bitstream. In such examples, the video encoder may remove the SPS ID from the buffering period SEI message. Further, a video encoder may generate the bitstream in such examples such that, for each access unit that includes a buffering period SEI message, there is also an active parameter sets SEI message that is the first SEI message in the first SEI NAL unit of the access unit.

In other examples, a video encoder may not provide an active parameter sets SEI message, and instead may include a VPS ID in the buffering period SEI message, e.g., as the first syntax element, which may be fixed-length coded, e.g., with four bits. According to the proposals for the HEVC standard, the buffering period SEI message may include a single SPS ID. In examples according to the present disclosure, the video encoder may include multiple SPS IDs, e.g., along with the VPS ID, in the buffering period SEI message. Additionally, in some examples, the video decoder may activate the VPS and the one or more SPSs through referencing the buffering period SEI message. Again, the coded video data may comprise a plurality of layers and/or views, and each of a plurality of SPSs may be used for coding, e.g., encoding or decoding, a respective one or more of the layers and/or views. In such examples, activation of multiple SPSs through referencing the buffering period SEI message, e.g., by a video decoder, may facilitate multiview, 3DV and/or scalable video coding.

FIG. 1 is a block diagram illustrating an example video encoding and decoding system 10 that may utilize the techniques for indicating active parameter sets and activating parameter sets described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 36. Similarly, encoded data may be accessed from storage device 36 by input interface 28 of destination device 14. Storage device 36 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 36 may correspond to a file server or another intermediate storage device that may hold the encoded video data generated by source device 12. Destination device 14 may access stored video data from storage device 36 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 36 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 may receive the encoded video data over link 16. The encoded video data communicated over link 16, or provided on storage device 36, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, e.g., the multiview video coding (MVC) or scalable video coding (SVC) extensions. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In addition, video encoder 20 may decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded pictures for use in inter-picture prediction.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference blocks (intra-prediction) or reference blocks from another picture (inter-prediction) to produce the video block for eventual display. Video decoder 30 may be configured, instructed controlled or directed to perform the inverse of the various processes performed by video encoder 20 based on the syntax elements provided by video encoder 20 with the encoded video data in the bitstream received by video decoder 30.

In some examples, video encoder 20 and video decoder 30 may employ techniques for multiview video coding, e.g., coding of video data including two or more views. In such examples, video encoder 20 may encode a bitstream that includes encoded video data for two or more views, and video decoder 30 may decode the encoded video data to provide the two or more views, e.g., to display device 32. In some examples, video decoder 30 may provide the multiple views of video data to enable display device 32 to display 3D video. In some examples, video encoder 20 and video decoder 30 may conform to a 3D-HEVC extension of the HEVC standard, e.g., in which multiview coding or multiview plus depth coding processes are used. An HEVC extension for 3D-HEVC coding processes is currently under development and, as presently proposed, makes use of multiview coding or multiview plus depth coding processes.

The 3DV extension of HEVC may be referred to as HEVC-based 3DV or 3D-HEVC. 3D-HEVC is based, at least in part, on solutions proposed in Schwarz et al, "Description of 3D Video Coding Technology Proposal by Fraunhofer HHI (HEVC compatible configuration A), ISO/IEC JTC1/SC29/WG11, Doc. MPEG11/M22570, Geneva, Switzerland, November/December 2011, hereinafter "m22570" and Schwarz et al, "Description of 3D Video Coding Technology Proposal by Fraunhofer HHI (HEVC compatible configuration B), ISO/IEC JTC1/SC29/WG11, Doc. MPEG11/M22571, Geneva, Switzerland, November/December 2011, hereinafter "m22571." A reference software description for 3D-HEVC is available at Schwarz et al, "Test Model under Consideration for HEVC based 3D video coding," ISO/IEC JTC1/SC29/WG11 MPEG2011/N12559, San Jose, USA, February 2012. Reference software, namely HTM version 3.0 is available, as of May 21, 2013, from https://hevc.hhi.fraunhofer.de/svn/svn_3DVCSoftware/tags/HTM-3.0/.

Multiview or 3D video coding may involve coding of two or more texture views and/or views including texture and depth components. In some examples, the video data encoded by video encoder 20 and decoded by video decoder 30 includes two or more pictures at any given time instance, i.e., within an "access unit," or data from which two or more pictures at any given time instance can be derived.

In some examples, a device, e.g., video source 18, may generate the two or more pictures by, for example, using two or more spatially offset cameras, or other video capture devices, to capture a common scene. Two pictures of the same scene captured simultaneously, or nearly simultaneously, from slightly different horizontal positions can be used to produce a three-dimensional effect. In some examples, video source 18 (or another component of source device 12) may use depth information or disparity information to generate a second (or other additional) picture of a second (or other additional) view at a given time instance from a first picture of a first view at the given time instance. In this case, a view within an access unit may include a texture component corresponding to a first view and a depth component that can be used, with the texture component, to generate a second view. The depth or disparity information may be determined by a video capture device capturing the first view, e.g., based camera parameters or other information known regarding the configuration of the video capture device and the capturing of the video data for the first view. The depth or disparity information may additionally or alternatively be calculated, e.g., by video source 18 or another component of source device 12, from camera parameters and/or video data in the first view.

To present 3D video, display device 32 may simultaneously, or nearly simultaneously, display two pictures associated with different views of a common scene, which were captured simultaneously or nearly simultaneously. In some examples, a user of destination device 14 may wear active glasses to rapidly and alternatively shutter left and right lenses, and display device 32 may rapidly switch between a left view and a right view in synchronization with the active glasses. In other examples, display device 32 may display the two views simultaneously, and the user may wear passive glasses, e.g., with polarized lenses, which filter the views to cause the proper views to pass through to the user's eyes. In other examples, display device 32 may comprise an autostereoscopic display, which does not require glasses for the user to perceive the 3D effect.

In the case of multiview coding, e.g., in 3D-HEVC, inter-picture prediction may include prediction of the current video block, e.g., PU, from another video block in a temporally-different picture, i.e., from a different access unit as the current picture, as well as prediction from a different picture in the same access unit as the current picture, but associated with a different view than the current picture. In the latter case, the inter-prediction can be referred to as inter-view coding. When coding a picture of a non-base view, e.g., a dependent view, a picture from the same access unit but a different view, e.g., from a reference view, may be added into a reference picture list. An inter-view reference picture can be put into any position of a reference picture list, as is the case with any inter prediction (e.g., temporal or inter-view) reference picture.

In multiview coding, there are two kinds of prediction vectors. One is a motion vector pointing to a block in a temporal reference picture, and the corresponding inter prediction is referred to as motion-compensated prediction (MCP). The other type of prediction vector is a disparity vector, which points to a block in a picture in the same access unit current picture, but of a different view. With a disparity vector, the corresponding inter prediction is referred to as disparity-compensated prediction (DCP).

In some examples, video encoder 20 and video decoder 30 may employ techniques for scalable video coding, e.g., coding a high-quality video bitstream that also contains one or more subset bitstreams. A subset video bitstream may be derived by dropping packets from the larger, high-quality video bitstream to reduce the bandwidth required for the subset bitstream. The subset bitstream can represent a lower spatial resolution (smaller screen), lower temporal resolution (lower frame rate), or lower quality video signal. The various bitstreams may be referred to as layers and sublayers. Scalable video coding may include defining or constructing operation points when the layers are presented in various organizations. In some examples, video encoder 20 and video decoder 30 may conform to a scalable video coding extension of a video coding standard, such as HEVC.

Scalable video coding may include temporal scalability for layers with different resolutions. For scalable video coding, a GOP may include a so-called key picture, and all pictures which are located in the output/display order between this key picture and the previous key picture. A key picture may be coded in regular or irregular intervals, and may be either intra-coded or inter-coded using the previous key picture as a reference for motion compensated prediction. The non-key pictures may be hierarchically predicted from pictures with lower temporal levels, and the key picture may have the lowest temporal level.

Scalable video coding may also include inter-layer prediction for spatial and signal-to-nose ratio (SNR) scalabilities based on texture, residue and motion. The spatial scalability in can be generalized to any resolution ratio between two layers. The SNR scalability can be realized by Coarse Granularity Scalability (CGS), Medium Granularity Scalability (MGS), or Fine Grain Scalability (FGS). Two spatial or CGS layers may belong to different dependency layers, while two MGS layers can be in the same dependency layer. Scalable video coding may provide inter-layer prediction methods that may be utilized to reduce the inter-layer redundancy. They are summarized as inter-layer texture prediction, inter-layer residual prediction, and inter-layer motion prediction.

Video encoder 20 generates a bitstream for receipt and/or retrieval by video decoder 30. The bitstream may include encoded data, e.g., encoded video data and syntax information, and may be referred to as an encoded bitstream. Video encoder 20 may organize the video data in the bitstream into network abstraction layer (NAL) units, each of which may be effectively a packet with an integer number of bytes. Video encoder 20, output interface 22, another component of source device 12, or another device may frame or encapsulate the NAL units in system transport protocol packets, e.g., Internet Protocol (IP) or Real-time Transport Protocol (RTP) packets, for transmission via link 16 or storage in storage device 36.

The NAL units may include video coding layer (VCL) NAL units and non-VCL NAL units. VCL NAL units include encoded video data, which may, as discussed above, include a plurality of layers and/or views. Non-VCL NAL units can include any associated additional information, such as syntax information, used to assist video decoder 30 in decoding and/or displaying video pictures represented by the encoded video data, or to provide error resilience.

The syntax information provided by video encoder 20 may include parameter sets, such as PPSs, SPSs and VPSs, as described above. In some examples, video encoder 20 may provide the parameter sets via the channel that carries VCL NAL units to which they apply, e.g., in advance of the VCL NAL units to which they apply via non-VCL NAL units, which may be referred to as "in-band" transmission of parameter sets. In other examples, video encoder 20 may provide parameter sets to video decoder 30 via a different transport mechanism, e.g., "out-of-band," which may be more reliable than the video channel itself. In other examples, video encoder 20 and/or video decoder 30 may be hard-coded with the parameter sets.

As discussed above, video decoder 30 may store the parameter sets in respective data structures for each parameter set type, e.g., a PPS table including a plurality of PPSs, an SPS table including a plurality of SPSs, and a VPS table including a plurality of VPSs, each parameter set in one of the data structures including different values for the set of parameters. Video decoder 30 may activate one or more parameter sets of each type at any given instance to decode encoded video data, e.g., by copying the data of the parameter set into respective decoding data structures, and applying the data in the decoding structures to decode the encoded video data.

Video decoder 30 may activate the parameter sets to decode video data of one or more VCL NAL units in response to their being referenced, directly or indirectly, in one or more of the VCL NAL units, e.g., in a slice header of a VCL NAL unit. As discussed above, each parameter set may include an ID, which may also be referenced in another parameter set (e.g., VPS ID reference in an SPS and SPS ID referenced in the PPS), or within the slice header or elsewhere within the VCL NAL unit. Video decoder 30 may activate a PPS based on the reference to its PPS ID in the slice header or elsewhere within the VCL NAL unit, activate a SPS based on the reference to its SPS ID in the activated PPS, and activate a VPS based on the reference to its VPS ID in the activates SPS.

The syntax information that video encoder 20 provides to video decoder 30 may also include supplemental enhancement information (SEI) messages. Some SEI messages are sequence level (e.g., relate to a coded group of pictures (GOP) or other sequence of coded video pictures), while others may relate to a particular coded picture. SEI messages are typically transmitted with a particular coded picture. That is, to retrieve an SEI message, a video decoder ordinarily needs to retrieve the encoded picture that includes the SEI message. One or more SEI messages may be included in a non-VCL NAL unit, which may be referred to as an SEI NAL unit.

A set of NAL units in a specified form may be referred to as an access unit. The decoding of each access unit by video decoder 30 may result in one or more decoded pictures or frames. In the case of multiview video coding, decoding of each access unit by video decoder 30 may result in two or more pictures or frames associated with respective views at the same (or substantially the same) instance in time. In the case of scalable video coding, each access unit may include a plurality of layers and/or sublayers of video data for a single picture or frame. An access unit generated by video encoder 20 may include one or more VCL NAL units, and one or more non-VCL NAL units, e.g., SEI NAL units, that contain syntax information, e.g., SEI messages, used by video decoder to decode the video data within the VCL NAL units of the access unit.

As discussed above, the SEI messages included in the encoded bitstream by video encoder 20 may include, as examples, a active parameter sets SEI message and a buffering period SEI message. According to proposals for the HEVC standard, the SPS may, in addition to being activated by being referenced in a PPS, be activated by being referenced in a buffering period SEI message. In such examples, video encoder 20 may code the buffering period SEI message such that it includes the SPS ID of the SPS to be activated. Video decoder 30 activates the SPS associated with the SPS ID in a decoded buffering period SEI message.

Additionally, according to HEVC WD8, video encoder 20 may encode an active parameter sets SEI message to indicate the currently-active VPS and the currently-active SPS, e.g., by inclusion of the VPS and SPS IDs for the currently active VPS and SPS in the active parameter sets SEI message. According to HEVC WD8, video decoder 30 does not activate the VPS and SPS by the VPS and SPS being referenced in the active parameter sets SEI message. Instead, video encoder 20 may include the active parameter sets SEI message in the encoded bitstream to indicate to video decoder 30 which parameter sets the video decoder should currently be active for decoding video data, and thereby allow the video decoder to confirm proper decoding operation.

In general, the active parameter sets SEI message specified by HEVC WD8 indicates which VPS is active and which SPS is active for the VCL NAL units of the access unit associated with the active parameter sets SEI message, e.g., within which the active parameter sets SEI message is included. The active parameter sets SEI message may also provide other information. According to HEVC WD8, an active parameter sets SEI message precedes, in decoding order, the first portion of video data, e.g., first VCL NAL unit, in the access unit, e.g., is within a non-VCL NAL unit that precedes the first VCL NAL unit in the access unit.

The syntax and semantics of the active parameter sets SEI message in the HVEC WD8 specification are as follows:

| active_parameter_sets( payloadSize ) { | Descriptor |
|---|---|
| active_vps_id | u(4) |
| active_seq_param_set_id | ue(v) |
| active_param_set_sei_extension_flag | u(1) |
| } | | active_vps_id indicates the VPS that is active for the VCL NAL units of the access unit associated with the active parameter sets SEI message.

active_seq_param_set_id indicates the identifier of the single SPS that is active for the VCL NAL units of the access unit associated with the active parameter sets SEI message. The value of active_seq_param_set_id may be in the range of 0 to 31, inclusive.

active_param_set_sei_extension_flag when equal to 0, indicates that no additional data follows within the active parameter sets SEI message. It is a requirement of bitstream conformance that the value of active_param_set_sei_extension_flag shall be equal to 0. The value 1 for active_param_set_sei_extension_flag is reserved for future use by ITU-T|ISO/IEC. Decoders shall ignore the value of active_param_set_sei_extension_flag in an active parameter sets SEI message and shall ignore all data that follows within an active parameter sets SEI message after the value 1 for active_param_set_sei_extension_flag.

As discussed above, in some examples according to the present disclosure, video encoder 20 may include multiple SPS IDs in an SEI message such that multiple active SPSs (some of which may be referred to as active layer SPSs) can be indicated. In some examples, rather than the single SPS ID specified by HEVC WD8, video encoder 20 may include multiple SPS IDs in the active parameter sets SEI message. Video encoder 20 may indicate multiple active SPSs, each of which may be used by video decoder 30 to decode one or more layers and/or views, to facilitate multiview, 3DV, or scalable video coding. In examples in which video encoder 20 includes multiple SPS IDs in the active parameter sets SEI message, the active parameter sets SEI message indicates which VPS is active and which SPSs are active for the VCL NAL units of the access unit associated with the active parameter sets SEI message.

In the various examples according to the present disclosure described herein described hereinafter, it is assumed that all SPSs share the same value space for their SPS IDs and different layers or views may share SPSs. If different layers or views do not share SPSs, then a layer ID or view ID also needs to be signaled, or the layer ID or view ID may be implicitly derived in addition to SPS ID to identify an SPS. For example, if an SPS applies only to the base layer or base view, the layer ID or view ID can be implicitly derived as equal to 0. Accordingly, a video coder may derive a layer ID based on a hierarchical position of a layer or view relative to other layers or views.

One example of the syntax and semantics of an active parameter sets SEI message that may be provided by video encoder 20 to indicate multiple SPSs according to the techniques of this disclosure is as follows:

| active_parameter_sets( payloadSize ) { | Descriptor |
|---|---|
| active_vps_id | u(4) |
| active_seq_param_set_id | ue(v) |
| bit_equal_to_one | f(1) |
| num_additional_sps_ids_minus1 | ue(v) |
| for( i = 0; i <= num_additional_sps_ids_minus1; i++ ) | |
|    additional_active_sps_id[ i ] | ue(v) |
| active_param_set_sei_extension2_flag | u(1) |
| } | | active_vps_id indicates the VPS that is active for the VCL NAL units of the access unit associated with the active parameter sets SEI message.

active_seq_param_set_id indicates the identifier of one SPS that is active for the VCL NAL units of the access unit associated with the SEI message. The value of active_seq_param_set_id may be in the range of 0 to 31, inclusive.

bit_equal_to_one is equal to 1. This syntax element is always equal to one for backward compatability.

num_additional_sps_ids_minus1 plus 1 specifies the number of additional SPSs (which may also be referred to as active layer SPSs) that are active for the VCL NAL units of the access unit associated with the SEI message. The value of num_additional_sps_ids_minus1 may be in the range of 0 to 30, inclusive.

additional_active_sps_id[i] specifies the identifier of the i-th additional SPS that is active for the VCL NAL units of the access unit associated with the active parameter sets SEI message. The value of additional_active_sps_id[i] may be in the range of 0 to 31, inclusive.

active_param_set_sei_extension2_flag when equal to 0, indicates that no additional data follows within the active parameter sets SEI message. It is a requirement of bitstream conformance that the value of active_param_set_sei_extension2_flag shall be equal to 0. The value 1 for active_param_set_sei_extension2_flag is reserved for future use by ITU-T|ISO/IEC. Decoders shall ignore the value of active_param_set_sei_extension2_flag in an active parameter sets SEI message and shall ignore all data that follows within an active parameter sets SEI message after the value 1 for active_param_set_sei_extension2_flag.

As another example, the syntax and semantics of the active parameter sets SEI message, which may be provided by video encoder 20 according to the techniques of this disclosure in both a base HEVC specification and an extension HEVC specification, e.g., for multiview, 3DV, or scalable video coding, may be as follows:

| active_parameter_sets( payloadSize ) { | Descriptor |
|---|---|
| active_vps_id | u(4) |
| num_sps_ids_minus1 | ue(v) |
| for( i = 0; i <= num_sps_ids_minus1; i++ ) | |
| active_sps_id[ i ] | ue(v) |
| active_param_set_sei_extension_flag | u(1) |
| } | | active_vps_id identifies the VPS that is active for the VCL NAL units of the access unit associated with the active parameter set SEI message.

num_sps_ids_minus1 plus 1 specifies the number of SPSs (some of which may also be referred to as active layer SPSs) that are active for the VCL NAL units of the access unit associated with the active parameter sets SEI message. The value of num_sps_ids_minus1 may be in the range of 0 to 31, inclusive.

active_sps_id[i] specifies the identifier of the i-th SPS that is active for the VCL NAL units of the access unit associated with the SEI message. The value of active_sps_id[i] may be in the range of 0 to 31, inclusive.

active_param_set_sei_extension_flag, when equal to 0, indicates that no additional data follows within the active parameter sets SEI message. It is a requirement of bitstream conformance that the value of active_param_set_sei_extension_flag shall be equal to 0. The value 1 for active_param_set_sei_extension_flag is reserved for future use by ITU-T|ISO/IEC. Decoders shall ignore the value of active_param_set_sei_extension_flag in an active parameter sets SEI message and shall ignore all data that follows within an active parameter sets SEI message after the value 1 for active_param_set_sei_extension_flag.

In the above examples in which video encoder 20 provides an active parameter sets SEI message that indicates an active VPS and one or more active SPSs, parameter sets activation may be the same as in HEVC WD8. For example, video decoder 30 may activate a PPS based on a PPS ID in a slice header provided in the encoded bitstream by video encoder 20. Video decoder 30 may further activate one or more SPSs based on SPS IDs in the thus activated PPS, or provided by video encoder 20 a buffering period SEI message, and may activate a VPS based on a VPS ID in an activated SPS.

In other examples in which an encoder 20 provides an SEI message that indicates an active VPS and one or more active SPSs, video decoder 30 may activate a VPS and/or one or more SPSs based on the VPS and/or SPSs being referenced in the SEI message. In such examples, the SEI message not only indicates the active VPS and the active SPSs, but also activates them. Accordingly, in such examples, the activation of the VPS and the SPSs is changed compared to that in HEVC WD8.

For example, video encoder 20 may provide an active parameter sets SEI message that indicates an active VPS and one or more active SPSs, and video decoder 30 may activate the VPS and/or one or more SPSs based on their being referenced in the SEI message. In addition, in such examples, the SPS ID may be removed from the buffering period SEI message, i.e., video encoder 20 may encode the buffering period SEI message such that it excludes any SPS ID. In such examples, video encoder 20 may encode the bitstream such that, for each access unit that includes a buffering period SEI message, there shall also be an active parameter sets SEI message, and the active parameter sets SEI message shall be the first SEI message in the first SEI NAL unit of the access unit.

The syntax and semantics of the buffering period SEI message that may be provided by video encoder 20 according to techniques in which the SPS ID is removed from the buffering period SEI message are as follows:

| buffering_period( payloadSize ) { | Descriptor |
|---|---|
| if( !sub_pic_cpb_params_present_flag ) | |
|    rap_cpb_params_present_flag | u(1) |
| if( NalHrdBpPresentFlag ) { | |
|    for( SchedSelIdx = 0; SchedSelIdx <= cpb_cnt_minus1; SchedSelIdx++ ) { | |
|      initial_cpb_removal_delay[ SchedSelIdx ] | u(v) |
|      initial_cpb_removal_delay_offset[ SchedSelIdx ] | u(v) |
|      if( sub_pic_cpb_params_present_flag \|\| rap_cpb_params_present_flag ) { | |
|        initial_alt_cpb_removal_delay[ SchedSelIdx ] | u(v) |
|        initial_alt_cpb_removal_delay_offset[ SchedSelIdx ] | u(v) |

-continued

| buffering_period( payloadSize ) { | Descriptor |
|---|---|
|         } | |
|       } | |
|     } | |
|     if( VclHrdBpPresentFlag ) { | |
|         for( SchedSelIdx = 0; SchedSelIdx <= cpb_cnt_minus1; SchedSelIdx++ ) { | |
|             initial_cpb_removal_delay[ SchedSelIdx ] | u(v) |
|             initial_cpb_removal_delay_offset[ SchedSelIdx ] | u(v) |
|             if( sub_pic_cpb_params_present_flag \|\| rap_cpb_params_present_flag) { | |
|                 initial_alt_cpb_removal_delay[ SchedSelIdx ] | u(v) |
|                 initial_alt_cpb_removal_delay_offset[ SchedSelIdx ] | u(v) |
|             } | |
|         } | |
|     } | |
| } | |

A change in the buffering period SEI message syntax and semantics relative to HEVC WD8 is the removal of the seq_parameter_set_id syntax element.

An example of syntax and semantics of the active parameter sets SEI message that may be provided by video encoder 20 according to techniques in which the active parameter sets SEI message activates a VPS and one or more SPSs, and the SPS ID is removed from the buffering period SEI message, is as follows:

| active_parameter_sets( payloadSize ) { | Descriptor |
|---|---|
|   active_vps_id | u(4) |
|   active_seq_param_set_id | ue(v) |
|   bit_equal_to_one | f(1) |
|   num_additional_sps_ids_minus1 | ue(v) |
|   for( i = 0; i <= num_additional_sps_ids_minus1; i++ ) | |
|     additional_active_sps_id[ i ] | ue(v) |
|   active_param_set_sei_extension2_flag | u(1) |
| } | | active_vps_id indicates the VPS that is active for the VCL NAL units of the access unit associated with the active parameter sets SEI message.

active_seq_param_set_id indicates the identifier of one SPS that is active for the VCL NAL units of the access unit associated with the SEI message. The value of active_seq_param_set_id may be in the range of 0 to 31, inclusive.

bit_equal_to_one is equal to 1.

num_additional_sps_ids_minus1 plus 1 specifies the number of additional SPSs (which may also be referred to as active layer SPSs) that are active for the VCL NAL units of the access unit associated with the SEI message. The value of num_additional_sps_ids_minus1 may be in the range of 0 to 30, inclusive.

additional_active_sps_id[i] specifies the identifier of the i-th additional SPS that is active for the VCL NAL units of the access unit associated with the active parameter sets SEI message. The value of additional_active_sps_id[i] may be in the range of 0 to 31, inclusive.

active_param_set_sei_extension2_flag when equal to 0, indicates that no additional data follows within the active parameter sets SEI message. It is a requirement of bitstream conformance that the value of active_param_set_sei_extension2_flag shall be equal to 0. The value 1 for active_param_set_sei_extension2_flag is reserved for future use by ITU-T|ISO/IEC. Decoders shall ignore the value of active_param_set_sei_extension2_flag in an active parameter sets SEI message and shall ignore all data that follows within an active parameter sets SEI message after the value 1 for active_param_set_sei_extension2_flag.

As another example, the syntax and semantics of the active parameter sets SEI message, which may be provided by video encoder 20 according to the techniques of this disclosure in both a base HEVC specification and an extension HEVC specification, e.g., for multiview, 3DV, or scalable video coding, according to techniques in which the active parameter sets SEI message activates a VPS and one or more SPSs, and the SPS ID is removed from the buffering period SEI message, may be as follows:

| active_parameter_sets( payloadSize ) { | Descriptor |
|---|---|
|   active_vps_id | u(4) |
|   num_sps_ids_minus1 | ue(v) |
|   for( i = 0; i <= num_sps_ids_minus1; i++ ) | |
|     active_sps_id[ i ] | ue(v) |
|   active_param_set_sei_extension_flag | u(1) |
| } | | active_vps_id identifies the VPS that is active for the VCL NAL units of the access unit associated with the active parameter set SEI message.

num_sps_ids_minus1 plus 1 specifies the number of SPSs (some of which may also be referred to as active layer SPSs) that are active for the VCL NAL units of the access unit associated with the active parameter sets SEI message. The value of num_sps_ids_minus1 may be in the range of 0 to 31, inclusive.

active_sps_id[i] specifies the identifier of the i-th SPS that is active for the VCL NAL units of the access unit associated with the SEI message. The value of active_sps_id[i] may be in the range of 0 to 31, inclusive.

active_param_set_sei_extension_flag when equal to 0, indicates that no additional data follows within the active parameter sets SEI message. It is a requirement of bitstream conformance that the value of active_param_set_sei_extension_flag shall be equal to 0. The value 1 for active_param_set_sei_extension_flag is reserved for future use by ITU-T|ISO/IEC. Decoders shall ignore the value of active_param_set_sei_extension_flag in an active parameter sets SEI message and shall ignore all data that follows within an active parameter sets SEI message after the value 1 for active_param_set_sei_extension_flag.

In other examples, rather than an active parameter sets SEI message, video encoder 20 provide a buffering period SEI message that indicates an active VPS and one or more active SPSs, and video decoder 30 may activates the VPS and/or one or more SPSs based on their being referenced in the buffering period SEI message. In such examples, the active parameter sets SEI message may be removed, e.g., video encoder 20 may encode the bitstream such that the access unit including the buffering period SEI message that activates the PPS and one or more SPSs does not include any active parameter sets SEI message providing syntax information to video decoder 30 for decoding the video data of the access unit. In addition, rather than a single SPS ID and no VPS ID, as specified in HEVC WD8, the buffering period SEI message may include a plurality of SPS IDs, as well as a VPS ID.

One example of the syntax and semantics of a buffering period SEI message that may be provided by video encoder 20 to activate a VPS and one or more SPSs is as follows:

num_sps_ids_minus1 plus 1 specifies the number of SPSs (some of which may also be referred to as active layer sequence parameter sets) that are active for the VCL NAL units of the access unit associated with the buffering period SEI message. The value of num_sps_ids_minus1 may be in the range of 0 to 31, inclusive.

active_sps_id[i] specifies the identifier of the i-th SPS that is active for the VCL NAL units of the access unit associated with the buffering period SEI message. The value of active_sps_id[i] may be in the range of 0 to 31, inclusive.

Another example of the syntax and semantics of a buffering period SEI message that may be provided by video encoder 20 to activate a VPS and one or more SPSs is as follows:

| buffering_period( payloadSize ) { | Descriptor |
|---|---|
|     video_parameter_set_id | u(4) |
|     num_sps_ids_minus1 | ue(v) |
|     for( i = 0; i <= num_sps_ids_minus1; i++ ) | |
|       active_sps_id [ i ] | ue(v) |
|     if( !sub_pic_cpb_params_present_flag ) | |
|       alt_cpb_params_present_flag | u(1) |
|     if( NalHrdBpPresentFlag ) { | |
|       for( SchedSelIdx = 0; SchedSelIdx <= cpb_cnt_minus1; SchedSelIdx++ ) { | |
|         initial_cpb_removal_delay[ SchedSelIdx ] | u(v) |
|         initial_cpb_removal_delay_offset[ SchedSelIdx ] | u(v) |
|         if( sub_pic_cpb_params_present_flag \|\| | |
|         alt_cpb_params_present_flag ) { | |
|           initial_alt_cpb_removal_delay[ SchedSelIdx ] | u(v) |
|           initial_alt_cpb_removal_delay_offset[ SchedSelIdx ] | u(v) |
|         } | |
|       } | |
|     } | |
|     if( VclHrdBpPresentFlag ) { | |
|       for( SchedSelIdx = 0; SchedSelIdx <= cpb_cnt_minus1; SchedSelIdx++ ) { | |
|         initial_cpb_removal_delay[ SchedSelIdx ] | u(v) |
|         initial_cpb_removal_delay_offset[ SchedSelIdx ] | u(v) |
|         if( sub_pic_cpb_params_present_flag \|\| | |
|         rap_cpb_params_present_flag) { | |
|           initial_alt_cpb_removal_delay[ SchedSelIdx ] | u(v) |
|           initial_alt_cpb_removal_delay_offset[ SchedSelIdx ] | u(v) |
|         } | |
|       } | |
|     } | |
| } | |

Semantics for those syntax elements not mentioned below are the same as in HEVC WD8.

active_vps_id identifies the VPS that is active for the VCL NAL units of the access unit associated with the buffering period SEI message.

| buffering_period( payloadSize ) { | Descriptor |
|---|---|
|     video_parameter_set_id | u(4) |
|     seq_parameter_set_id | ue(v) |
|     num_addtional_sps_ids | ue(v) |
|     for( i = 0; i < num_additional_sps_ids; i++ ) | |
|       sps_id_additional[ i ] | ue(v) |
|     if( !sub_pic_cpb_params_present_flag ) | |
|       alt_cpb_params_present_flag | u(1) |
|     if( NalHrdBpPresentFlag ) { | |
|       for( SchedSelIdx = 0; SchedSelIdx <= cpb_cnt_minus1; SchedSelIdx++ ) { | |
|         initial_cpb_removal_delay[ SchedSelIdx ] | u(v) |
|         initial_cpb_removal_delay_offset[ SchedSelIdx ] | u(v) |
|         if( sub_pic_cpb_params_present_flag \|\| | |
|         alt_cpb_params_present_flag ) { | |
|           initial_alt_cpb_removal_delay[ SchedSelIdx ] | u(v) |
|           initial_alt_cpb_removal_delay_offset[ SchedSelIdx ] | u(v) |

| buffering_period( payloadSize ) { | Descriptor |
|---|---|
|         } | |
|       } | |
|     } | |
|     if( VclHrdBpPresentFlag ) { | |
|       for( SchedSelIdx = 0; SchedSelIdx <= cpb_cnt_minus1; SchedSelIdx++ ) { | |
|         initial_cpb_removal_delay[ SchedSelIdx ] | u(v) |
|         initial_cpb_removal_delay_offset[ SchedSelIdx ] | u(v) |
|         if( sub_pic_cpb_params_present_flag \|\| | |
|     rap_cpb_params_present_flag) { | |
|           initial_alt_cpb_removal_delay[ SchedSelIdx ] | u(v) |
|           initial_alt_cpb_removal_delay_offset[ SchedSelIdx ] | u(v) |
|         } | |
|       } | |
|     } | |
| } | |

Semantics for those syntax elements not mentioned below are the same as in HEVC WD8.

video_parameter_set_id identifies the VPS that is active for the VCL NAL units of the access unit associated with the buffering period SEI message.

num_additional_sps_ids specifies the number of additional SPSs (which may also be referred to as active layer SPSs) that are active for the VCL NAL units of the access unit associated with the buffering period SEI message. The value of num_additional_sps_ids may be in the range of 0 to 31, inclusive.

sps_id_additional[i] specifies the identifier of the i-th additional SPS that is active for the VCL NAL units of the access unit associated with the buffering period SEI message. The value of sps_id_additional[i] may be in the range of 0 to 31, inclusive.

The first example syntax and semantics of the buffering period SEI message used to activate a PPS and one or more SPSs may be used, for example, in an extension specification, e.g., of HEVC, for multiview of scalable video coding. The second example syntax and semantics of the buffering period SEI message used to activate a PPS and one or more SPSs may be used, for example, in either a base specification or an extension specification, e.g., of HEVC. In some examples, the syntax elements num_additional_sps_ids and sps_id_additional[i] of the second example syntax and semantics of the buffering period SEI message are only present in an extension specification, and not present in the base specification, e.g., of HEVC. In some examples, in the base specification, the value of the syntax element num_additional_sps_ids of the second example is required to be equal to 0. In examples in which these syntax elements are not present in the base specification, either a new buffering period SEI message may be needed in extensions, or a new different type of SEI message may be needed to convey additional SPS IDs.

In examples according to this disclosure in which the VPS and one or more SPSs are activated by video decoder 30 based on being referenced in an SEI message, e.g., such as the examples described above with respect to the active parameter sets SEI message and buffering period SEI message, the activation may, according to some examples, be as follows. An SPS raw bite sequence payload (RBSP) includes parameters that can be referred to by one or more PPS RBSPs or one or more SEI NAL units containing an SEI message, e.g., an active parameter sets or buffering period SEI message. Each SPS RBSP, e.g., stored in a table or other data structure of SPSs, is initially considered not active at the start of the operation of the decoding process. At most one SPS RBSP may be considered active at any given moment for a particular layer or view during the operation of the decoding process, and the activation of any particular SPS RBSP results in the deactivation of the previously-active SPS RBSP (if any) for the particular layer or view.

When a particular SPS RBSP, with a particular SPS ID value (e.g., value of seq_parameter_set_id) is not already active, and it is referred to by activation of a PPS RBSP, e.g., using that SPS ID value, or is referred to by an SEI NAL unit containing an SEI message, e.g., using that SPS ID value, it is activated for the particular layer or view as identified by the layer ID or view ID included in the VCL NAL units of the access unit containing the SEI message or the VCL NAL units that refer to the PPS RBSP. The SEI message may be an active parameter sets SEI message or buffering period SEI message, as discussed above. This SPS RBSP is called the active SPS RBSP for the particular layer or view until it is deactivated by the activation of another SPS RBSP for the same layer or view. Video encoder 20 may provide a SPS RBSP, with that particular SPS ID value, e.g., value of seq_parameter_set_id, to decoder 30 prior to to the decoding process and activation of the SPS. For example, the encoder may provide the SPS by inclusion in at least one access unit with TemporalId equal to 0, unless the SPS is provided to decoder 30 through external means. An activated SPS RBSP for a particular layer or view shall remain active for the particular layer for the entire coded video sequence.

Any SPS NAL unit containing the SPS ID value, e.g., a value of seq_parameter_set_id, for the active SPS RBSP for a particular layer or view for a coded video sequence shall have the same content as that of the active SPS RBSP for the layer or view for the coded video sequence unless it follows the last access unit of the coded video sequence and precedes the first VCL NAL unit and the first SEI NAL unit containing an SEI message, e.g., active parameter sets or buffering period SEI message, when present, of another coded video sequence.

A VPS RBSP includes parameters that can be referred to by one or more SPS RBSPs or, according to the techniques of this disclosure, one or more SEI NAL units containing a SEI message. The SEI message may be an active parameter sets SEI message or buffering period SEI message, as discussed above. Each VPS RBSP is initially considered not active at the start of the operation of the decoding process. At most one VPS RBSP is considered active at any given moment during the operation of the decoding process, and the activation of any particular VPS RBSP results in the deactivation of the previously-active VPS RBSP (if any).

When a VPS RBSP with a particular VPS ID value (e.g., value of video_parameter_set_id) is not already active and it is referred to by activation of a SPS RBSP, e.g., using that VPS ID value, or, according to the techniques of this disclosure, is referred to by an SEI NAL unit containing an SEI message, e.g., using that VPS ID value, it is activated. As discussed above, the SEI message may be an active parameter sets or buffering period SEI message, as examples. The VPS RBSP with the particular VPS ID value is called the active VPS RBSP until it is deactivated by the activation of another VPS RBSP. A VPS RBSP, with that particular VPS ID value, shall be available to video decoder 30 prior to its activation, and included in at least one access unit with TemporalId equal to 0, unless the VPS is provided to video decoder 30 through external means. An activated VPS RBSP shall remain active for the entire coded video sequence. Any VPS NAL unit containing the VPS ID value, e.g., value of video_parameter_set_id, for the active VPS RBSP for a coded video sequence shall have the same content as that of the active VPS RBSP for the coded video sequence unless it follows the last access unit of the coded video sequence and precedes the first VCL NAL unit and the first sequence parameter set NAL unit of another coded video sequence.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
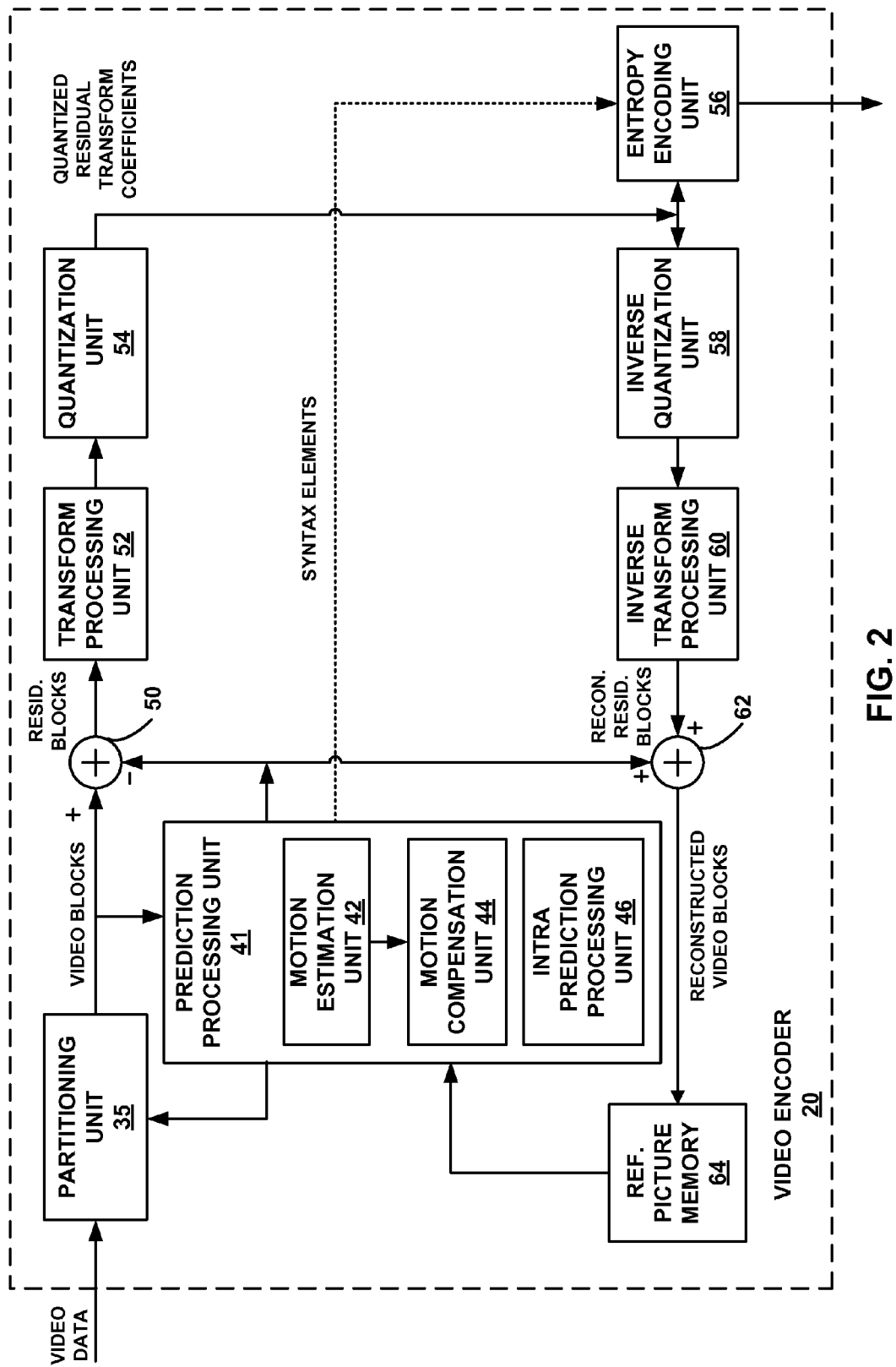
FIG. 2 is a block diagram illustrating the video encoder shown in the example of FIG. 1 in more detail.

FIG. 2 is a block diagram illustrating an example configuration of video encoder 20, which may implement techniques for activation of parameter sets and indication of which parameter sets are active for video coding according to this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction processing unit 41, reference picture memory 64, summer 50, transform processing unit 52, quantization unit 54, and entropy encoding unit 56. Prediction processing unit 41 includes motion estimation unit 42, motion compensation unit 44, and intra prediction processing unit 46. For video block reconstruction, video encoder 20 also includes inverse quantization unit 58, inverse transform processing unit 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. The example configuration of video encoder 20 illustrated in FIG. 2 generally illustrates the components that encode video blocks within a video slice to be encoded. The slice may be divided into multiple video blocks (and possibly into sets of video blocks referred to as tiles).

Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation.

Motion compensation unit 44 may also generate syntax elements associated with the video blocks and the video slice for use by video decoder 30 in decoding the video blocks of the video slice. For example, motion compensation unit 44 may generate parameter sets and SEI messages according to the techniques of this disclosure. In other examples, motion estimation unit 42, intra prediction processing unit 46, prediction processing unit 41, and/or another component of video encoder 20 may generate the parameter sets, SEI messages, and other syntax information described herein according to the techniques of this disclosure.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or a mode select unit (not shown), in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Video encoder 20 may include configuration data in the transmitted bitstream. The configuration data may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors, other motion information, and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

As discussed above, motion compensation unit 44, motion estimation unit 42, intra prediction processing unit 46, prediction processing unit 41, and/or another component of video encoder 20, may generate syntax information used by video decoder 30 to decode video data encoded by video encoder 20. The syntax information may include parameter sets, such as VPSs, SPSs and PPSs. The syntax information may also include SEI messages configured according to the techniques of this disclosure, such as active parameter sets SEI messages and buffering period SEI messages configured according to the techniques described herein. Entropy encoding unit 56 may encode the SEI messages, or otherwise include the SEI messages as part of an encoded bitstream.

In this manner, video encoder 20 of FIG. 2 represents an example of a video encoder configured to encode a bitstream that includes video data and syntax information for encoding the video data, wherein the syntax information comprises a SEI message of an access unit, wherein the SEI message indicates a plurality of SPSs and a VPS for decoding video data of the access unit, and encode the video data of the access unit based on the plurality of SPSs and the VPS indicated in the SEI message.

Video encoder 20 of FIG. 2 also represents an example of a video encoder configured to encode a bitstream that includes video data and syntax information for decoding the video data, wherein the syntax information comprises a SEI message, and wherein the SEI message indicates one or more SPSs and a VPS, and encode the video data based on the one or more SPSs and the VPS indicated in the SEI message. Video encoder 20 may encode the bitstream to include the SEI message such that a video decoder activates the one or more SPSs and the VPS for decoding the video data in response to the indication of the one or more SPSs and the VPS in the SEI message.

Video encoder 20 encodes an SEI message to cause video decoder 30 to activate parameter sets, or to indicate to video decoder 30 which parameter sets are active. Video encoder 20 also encodes the video data of based on the one or more SPSs and the VPS indicated in the SEI message. For example, video encoder 20 may encode the video data using particular values for varies parameters, and then may select parameter sets for use by video decoder 30 in decoding the video data based on the parameter values used to encode the video data. Video encoder 20 may then encodes one or more SEI messages to cause video decoder 30 to activate parameter sets, or to indicate to video decoder 30 which parameter sets are active.

Figure 3:
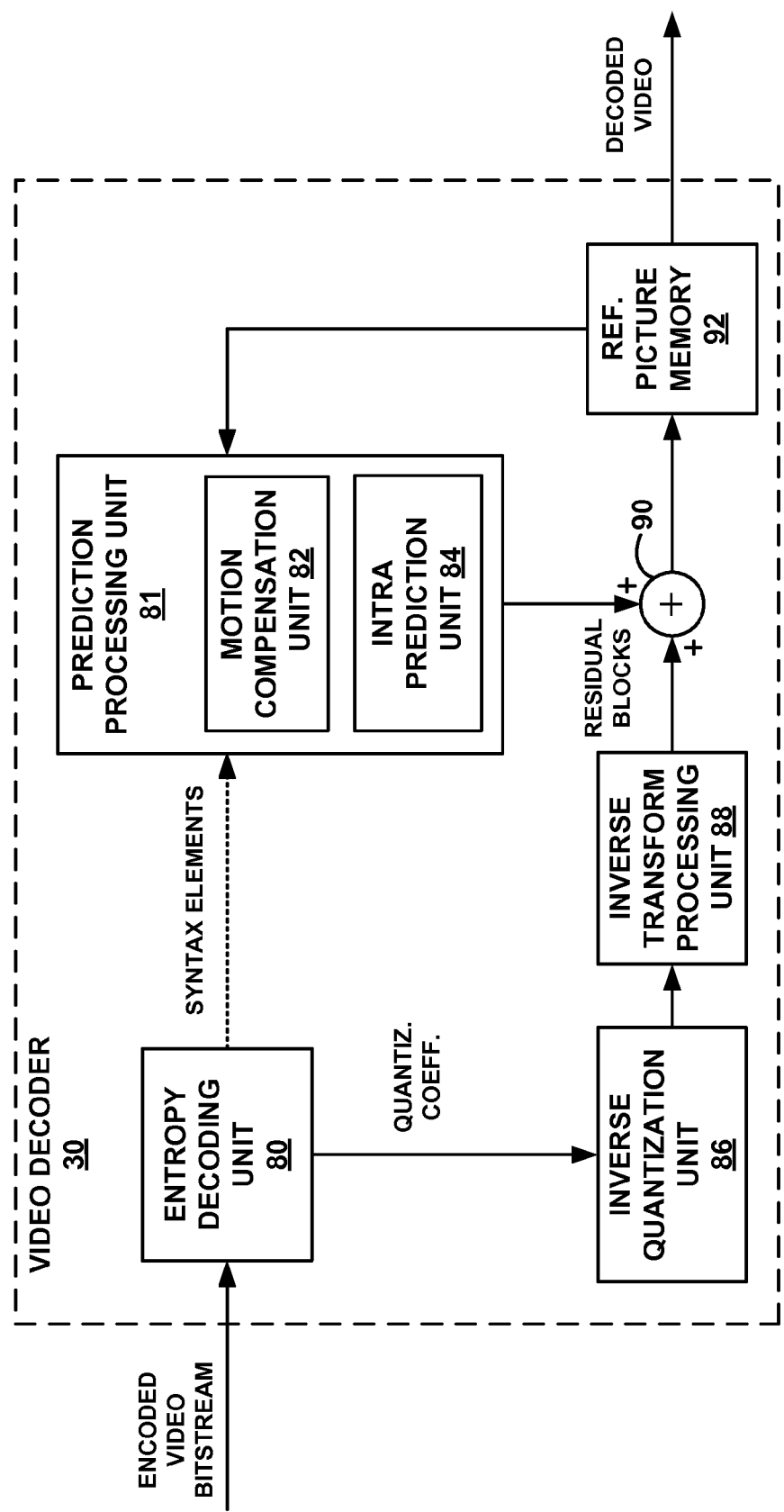
FIG. 3 is a block diagram illustrating the video decoder shown in the example of FIG. 1 in more detail.

FIG. 3 is a block diagram illustrating an example of video decoder 30 that may implement techniques for activation of parameter sets and indication of which parameter sets are active for video coding according to this disclosure. In the example of FIG. 3, video decoder 30 includes an entropy decoding unit 80, prediction processing unit 81, inverse quantization unit 86, inverse transformation processing unit 88, summer 90, and reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax information, e.g., syntax elements from video encoder 20. Entropy decoding unit 80 of video decoder 30 entropy decodes the bitstream to generate quantized coefficients, motion vectors, other motion information, and other syntax information. Entropy decoding unit 80 forwards the motion information and other syntax elements to prediction processing unit 81. Video decoder 30 may receive the syntax information at the video slice level and/or the video block level, as examples.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax information, and uses the prediction information to produce the predictive blocks for the current video block being decoded. For example, motion compensation unit 82 uses some of the received syntax information to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

According to the techniques of this disclosure, entropy decoding unit 80 may decode, e.g., entropy decode, an encoded bitstream that includes video data and syntax information. The syntax information may include one or more SEI messages, such as active parameter sets and buffering period SEI messages, as discussed herein. Prediction processing unit 81, e.g., motion compensation unit 82 and/or intra prediction unit 84, may activate one or more parameter sets, e.g., a VPS and one or more SPSs, based on their being referenced in at least one of the SEI messages. In other examples, the SEI message may indicate which parameter sets, e.g., which VPS and one or more SPSs, are active to prediction processing unit 81, e.g., motion compensation unit 82 and/or intra prediction unit 84. In either case, prediction processing unit 81, e.g., motion compensation unit 82 and/or intra prediction unit 84, may use the active parameter sets for decoding the video data within the encoded bitstream.

In this manner, video decoder 30 of FIG. 3 represents an example of a video decoder configured to decode a bitstream that includes video data and syntax information for decoding the video data, wherein the syntax information comprises a SEI message of an access unit, wherein the SEI message indicates a plurality of SPSs and a VPS for decoding video data of the access unit, and decode the video data of the access unit based on the plurality of SPSs and the VPS indicated in the SEI message.

Video decoder 30 also represents an example of a video decoder configured to decode a bitstream that includes video data and syntax information for decoding the video data, wherein the syntax information comprises a SEI message, and wherein the SEI message indicates one or more SPSs and VPS, activate the one or more SPSs and the VPS for decoding the video data based on the indication of the one or more SPSs and the VPS in the SEI message, and decode the video data based on the one or more activated SPSs and the activated VPS.

Figure 4:
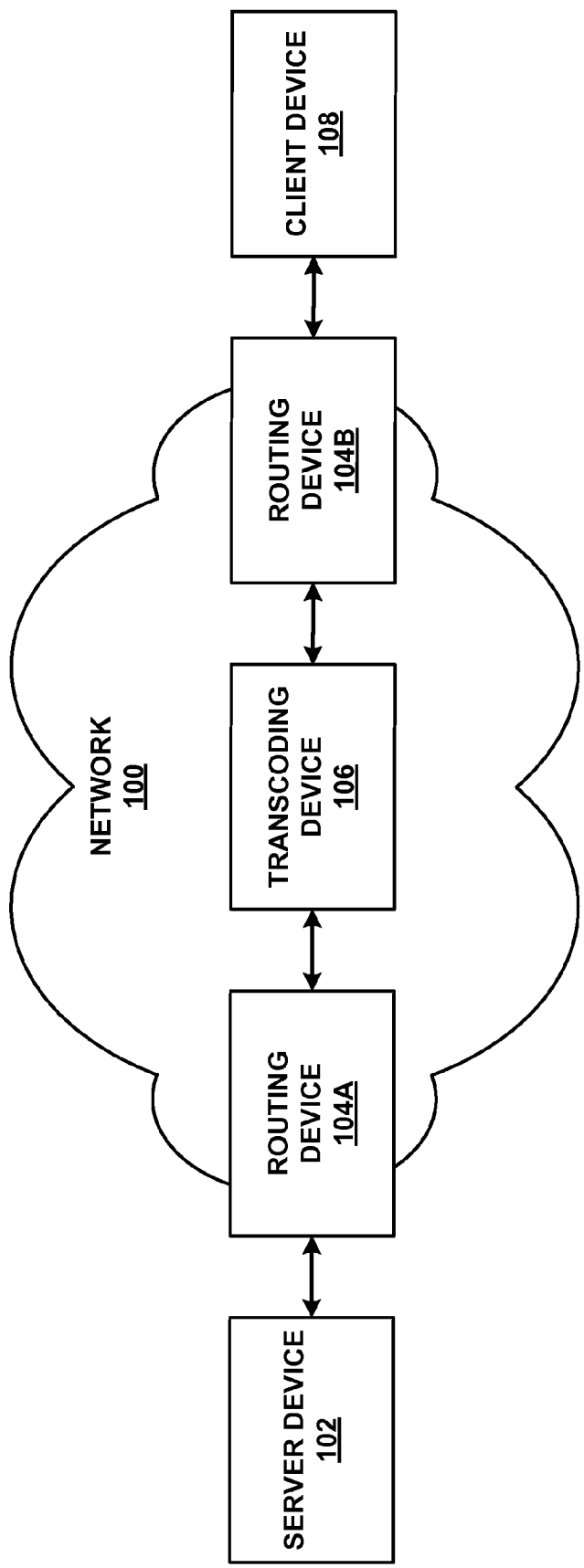
FIG. 4 is a block diagram illustrating an example set of devices that form part of a network.

FIG. 4 is a block diagram illustrating an example set of devices that form part of network 100. In this example, network 10 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. In some examples, network devices that have media awareness, i.e., so-called media aware network elements (MANEs), may implement or use one or more of the parameter set signaling techniques described herein. Moreover, additional network devices may be provided along a network path between server device 102 and client device 108. Server device 102 may correspond to source device 12 (FIG. 1), while client device 108 may correspond to destination device 14 (FIG. 1), in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure, including coding a bitstream that includes video data and syntax information for coding the video data, wherein the syntax information comprises a SEI message for an access unit of the video data, wherein the SEI message indicates a plurality of SPSs and a VPS, activating the one or more SPSs and the VPS for coding the video data of the access unit based on the indication of the one or more SPSs and the VPS in the SEI message, and/or coding the video data of the access unit based on the plurality of SPSs and the VPS indicated in the SEI message. Moreover, the source device 12 and destination device 14 of FIG. 1, video encoder 20 shown in FIG. 2 and video decoder 30 shown in FIG. 3 are also example devices that can be configured to perform the techniques of this disclosure, including coding a bitstream that includes video data and syntax information for coding the video data, wherein the syntax information comprises a SEI message for an access unit of the video data, wherein the SEI message indicates a plurality of SPSs and a VPS, activating the one or more SPSs and the VPS for coding the video data of the access unit based on the indication of the one or more SPSs and the VPS in the SEI message, and/or coding the video data of the access unit based on the plurality of SPSs and the VPS indicated in the SEI message. Other network elements, such as a MANE, may also use techniques of this disclosure to improve the communication or delivery of video data to other devices.

Figure 5:
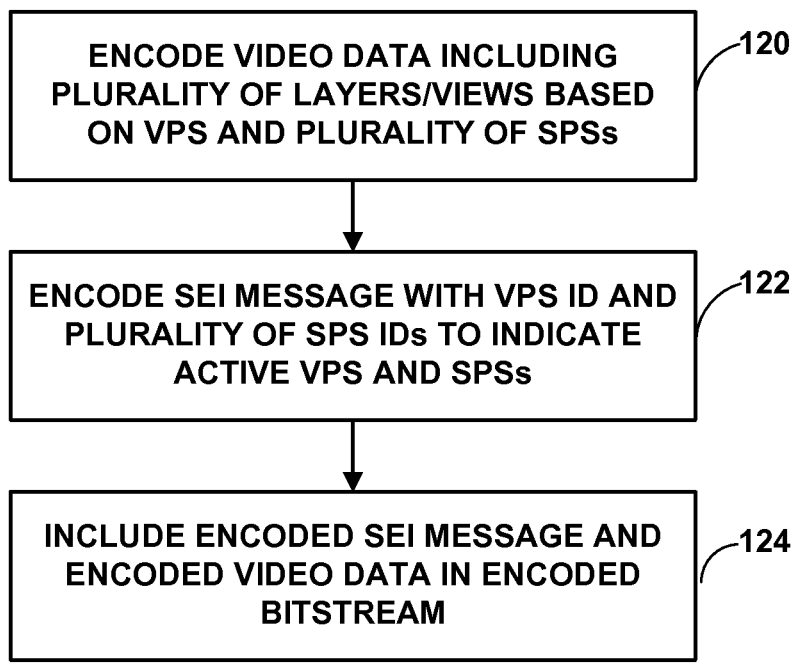
FIG. 5 is a flow diagram illustrating an example method for encoding a bitstream to include a supplemental enhancement information (SEI) message that indicates to a video decoder an active video parameter set (VPS) and a plurality of active sequence parameter sets (SPSs) for decoding encoded video data in the bitstream.

FIG. 5 is a flow diagram illustrating an example method for encoding a bitstream to include a supplemental enhancement information (SEI) message that indicates to a video decoder an active video parameter set (VPS) and a plurality of active sequence parameter sets (SPSs) for decoding encoded video data in the bitstream. According to the example of FIG. 5, a video encoder, e.g., video encoder 20 of FIG. 2, encodes video data, e.g., of an access unit, based on a VPS and a plurality of SPSs (120). The video data may comprise a plurality of layers, e.g., for scalable video coding. The video data may additionally or alternatively comprise a plurality of views, e.g., for multiview or 3D video coding. Each of the plurality of SPSs may be associated with, e.g., used to encode, the video data of a respective one or more of the plurality of layers and/or views.

The video encoder may maintain VPSs, SPSs and other parameter sets in data structures, and activate the parameter sets for encoding video data, in a manner similar to that described herein with respect to a video decoder, e.g., video decoder 30, and decoding video data. In other examples, the video encoder does not necessarily maintain and activate parameter set in a manner similar to the video decoder. In some examples, the video encoder encodes the video data according to parameter values or settings that correspond to the parameter sets, e.g., VPS and SPSs, maintained by the video decoder and, in this manner, the video encoder encodes the video data according to the parameter sets.

According to the example of FIG. 5, the video encoder may further, e.g., after encoding the video data, encode an SEI message with a VPS ID and a plurality of SPS IDs to indicate, e.g., to the video decoder, the active VPS and SPSs for decoding video data of the access unit (122). In some examples, the SEI message is an active parameter sets SEI message. In other examples, the SEI message is another SEI message, such as a buffering period SEI message. The video encoder includes the encoded SEI message and the encoded video data in an encoded bitstream, e.g., to be provided to video decoder 30 (124). In some examples, the video encoder may include the encoded video data in VCL NAL units of an access unit, and include the SEI message in SEI NAL units of the access unit.

Figure 6:
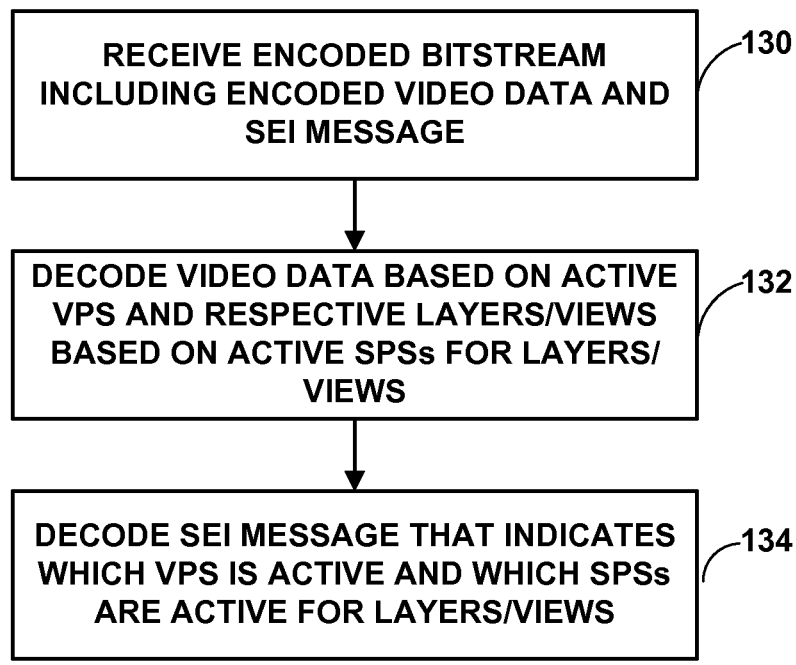
FIG. 6 is a flow diagram illustrating an example method for decoding a bitstream that includes an SEI message that indicates an active VPS and a plurality of active SPSs for decoding video data of the bitstream.

FIG. 6 is a flow diagram illustrating an example method for decoding a bitstream that includes an SEI message that indicates an active VPS and a plurality of active SPSs for decoding video data of the bitstream. According to the example method of FIG. 6, a video decoder, e.g., video decoder 30 of FIG. 3, receives an encoded bitstream including encoded video data and an SEI message (130). The encoded bitstream may comprises a plurality of access units, each of which may include video data, e.g., in one or more VCL NAL units, and one or more SEI messages, e.g., in one or more SEI NAL units.

The video data may comprise a plurality of layers, e.g., for scalable video coding. The video data may additionally or alternatively comprise a plurality of views, e.g., for multiview or 3D video coding. The SEI message may be an active parameter sets SEI message, or another SEI message, such as a buffering period SEI message.

According to the example method of FIG. 6, the video decoder decodes the video data of an access unit based on an active VPS and a plurality of active SPSs for the access unit (132). Each of the plurality of SPSs may be associated with, e.g., used to decode, the video data of a respective one or more of a plurality of layers and/or views. The video decoder also decodes the SEI message (134). The SEI message may include a VPS ID that indicates the active VPS for decoding video data of the access unit. The SEI message may also include a plurality of SPS IDs that indicate that active SPSs for decoding the plurality of layers and/or views of the access unit. The video decoder may use the indications of the VPS and SPSs in the SEI message to, for example, confirm that the proper VPS and SPS have been or are being used to decode the video data of the access unit.

Figure 7:
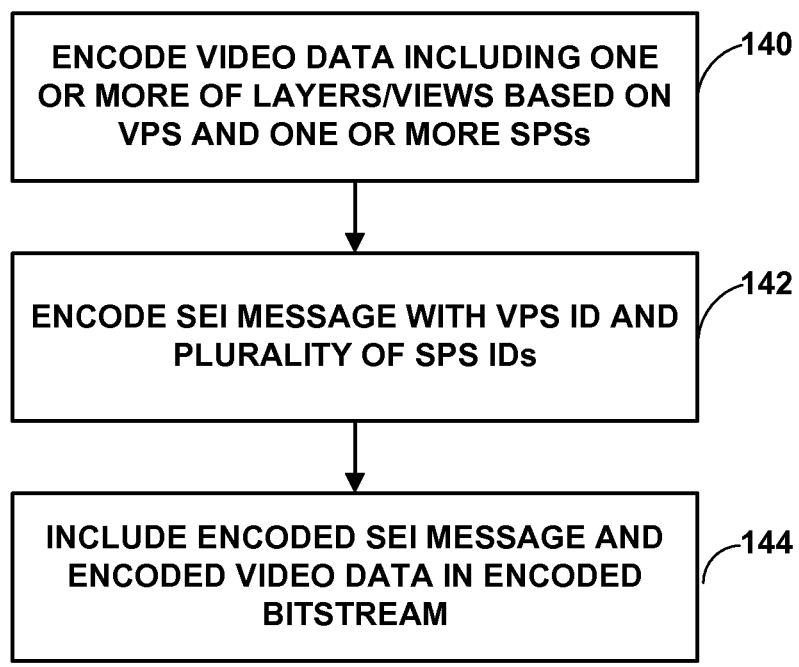
FIG. 7 is a flow diagram illustrating an example method for encoding a bitstream to include an SEI message that indicates to a video decoder a VPS and one or more SPSs to be activated by a video decoder for decoding video data of the bitstream.

FIG. 7 is a flow diagram illustrating an example method for encoding a bitstream to include an SEI message that indicates to a video decoder a VPS and one or more SPSs to be activated by the video decoder for decoding video data of the bitstream. According to the example method of FIG. 7, a video encoder, e.g., video encoder 20 of FIG. 3, encodes video data, e.g., of an access unit, based on a VPS and a one or more SPSs (140). The video data may comprise a plurality of layers, e.g., for scalable video coding. The video data may additionally or alternatively comprise a plurality of views, e.g., for multiview or 3D video coding. Each of a plurality of SPSs may be associated with, e.g., used to encode, the video data of a respective one or more of the plurality of layers and/or views.

According to the example of FIG. 7, the video encoder may further, e.g., after encoding the video data, encode an SEI message with a VPS ID and one or more SPS IDs to cause a video decoder to activate the VPS and the one or more SPSs for decoding the video data of the access unit (142). In some examples, the SEI message is an active parameter sets SEI message. In other examples, the SEI message is another SEI message, such as a buffering period SEI message.

The video encoder includes the encoded SEI message and the encoded video data in an encoded bitstream, e.g., to be provided to video decoder 30 (144). In some examples, the video encoder may include the encoded video data in VCL NAL units of an access unit, and include the SEI message in SEI NAL units of the access unit. In examples in which the SEI message based upon which a video decoder activates parameter sets to decode video data of an access unit is an active parameter sets SEI message, the video encoder may encode a buffering period SEI message for the access unit such that it excludes any SPS ID. Additionally, in examples in which the SEI message is an active parameter sets SEI message, the video encoder may encode the bitstream such that each access unit that includes a buffering period SEI message also includes an active parameter sets SEI message that is the first SEI message in the first SEI NAL unit of the access unit. In examples in which the SEI message based upon which a video decoder activates parameter sets to decode video data of an access unit is a buffering period SEI message, the video encoder may generate the encoded bitstream, e.g., the access unit within the bitstream, to exclude any active parameter sets SEI message.

Figure 8:
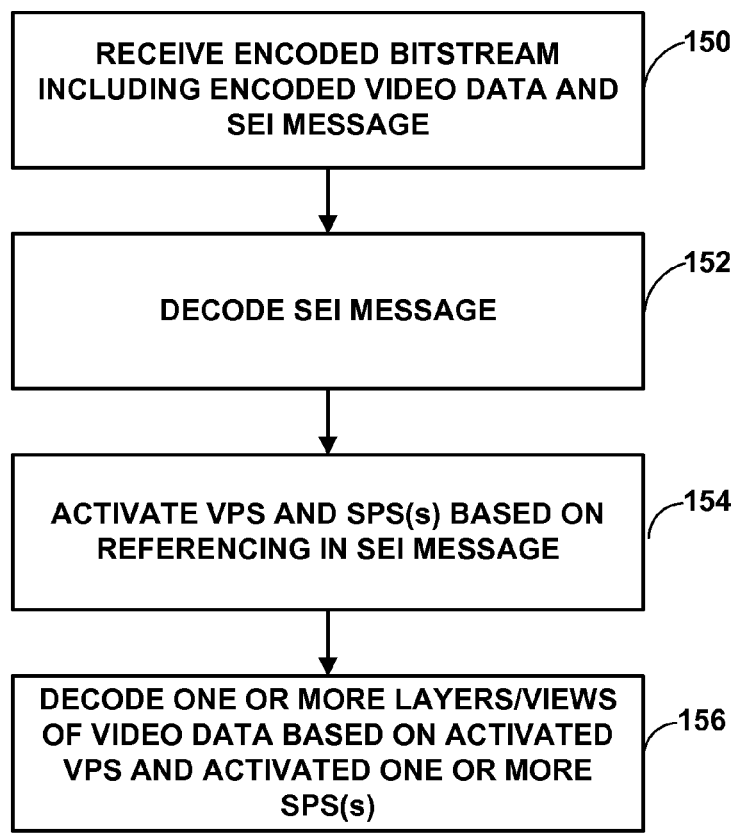
FIG. 8 is a flow diagram illustrating an example method for decoding a bitstream that includes an SEI message, and activating a VPS and one or more SPSs for decoding video data of the bitstream based on referencing the VPS and one or more SPSs in the SEI message.

FIG. 8 is a flow diagram illustrating an example method for decoding a bitstream that includes an SEI message, and activating a VPS and one or more SPSs for decoding video data of the bitstream based on referencing the VPS and one or more SPSs in the SEI message. According to the example method of FIG. 8, a video decoder, e.g., video decoder 30 of FIG. 3, receives an encoded bitstream including encoded video data and an SEI message (150). The encoded bitstream may comprises a plurality of access units, each of which may include video data, e.g., in one or more VCL NAL units, and one or more SEI messages, e.g., in one or more SEI NAL units.

The video data may comprise a plurality of layers, e.g., for scalable video coding. The video data may additionally or alternatively comprise a plurality of views, e.g., for multiview or 3D video coding. The SEI message may be an active parameter sets SEI message, or another SEI message, such as a buffering period SEI message.

According to the example method of FIG. 8, the video decoder decodes the SEI message (152). The SEI message may be included within one of the access units, and thereby is associated with that access unit. The video decoder then activates the VPS and the one or more SPSs based on the VPS and one or more SPSs being referenced in the SEI message, e.g., based on the inclusion of the VPS and SPS IDs of the VPS and SPSs in the SEI message (154). The video decoder then decodes the video data of the access unit based on an active VPS and the one or more active SPSs for the access unit (156). In examples in which the SEI message includes a plurality of SPS IDs, each of the plurality of referenced SPSs may be associated with, e.g., used to decode, the video data of a respective one or more of a plurality of layers and/or views.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   decoding a bitstream that includes video data and syntax information for decoding the video data,
   wherein decoding the syntax information comprises:
      decoding an active parameter sets supplemental enhancement information (SEI) message of an access unit, wherein the active parameter sets SEI message indicates a plurality of sequence parameter sets (SPSs) and a video parameter set (VPS) for decoding video data of the access unit, and
   wherein decoding the active parameter sets SEI message comprises:
      decoding a first syntax element that specifies the number of the plurality of SPSs, and
      decoding, based on the specified number of the plurality of SPSs, one or more additional syntax elements that comprise respective identifiers for each of the plurality of SPSs;
   activating the plurality of SPSs and the VPS based on the indication of the plurality of SPSs and the VPS in the active parameter sets SEI message; and
   decoding the video data of the access unit based on the plurality of activated SPSs and the activated VPS indicated in the active parameter sets SEI message.

2. The method of claim 1, wherein the active parameter sets SEI message precedes, in decoding order, a first portion of the video data of the access unit.

3. The method of claim 1,
   wherein decoding the first syntax element that specifies the number of the plurality of SPSs comprises decoding a num_sps_ids_minus1 syntax element, and
   wherein decoding, based on the specified number of the plurality of SPSs, the one or more additional syntax elements that comprise respective identifiers for each of the plurality of SPSs comprises decoding active_sps_id [i] syntax elements for i=0; i≤num_sps_ids_minus1; i++.

4. The method of claim 1,
   wherein the video data comprises at least one of a plurality of layers or a plurality of views,
   wherein each of the plurality of SPSs is associated with a respective one or more of the plurality of layers or plurality of views, and
   wherein decoding the video data of the access unit based on the plurality of SPSs and the VPS comprises, for each of the layers or views, decoding the video data of the layer or view based on the SPS associated with the layer or view.

5. The method of claim 4, further comprising:
   determining identifiers that are respectively associated with the plurality of layers or views, wherein determining the identifiers comprises at least one of:
      decoding at least one of the identifiers, or
      deriving at least one of the identifiers based on a hierarchical position of the respective layer or view; and
   determining the plurality of SPSs for respectively decoding the video data of the plurality of layers or views based on the indication in the SEI message and the determined identifiers.

6. The method of claim 4, wherein each of the plurality of SPSs is associated with a respective one or more of the plurality of layers, and at least one of the plurality of SPSs comprises an active layer SPS.

7. The method of claim 4, wherein the video data comprises at least one of multiview video data, three-dimensional video data, or scalable video coding video data.

8. A device comprising:
   a memory configured to store video data; and
   a video decoder configured to:
      decode a bitstream that includes the video data and syntax information for decoding the video data;

decode an active parameter sets supplemental enhancement information (SEI) message of an access unit included in the syntax information, wherein the active parameter sets SEI message indicates a plurality of sequence parameter sets (SPSs) and a video parameter set (VPS) for decoding video data of the access unit;

decode a first syntax element included in the active parameter sets SEI message, wherein the first syntax element specifies the number of the plurality of SPSs;

decode, based on the specified number of the plurality of SPSs, one or more additional syntax elements included in the active parameter sets SEI message, wherein the one or more additional syntax elements comprise respective identifiers for each of the plurality of SPSs;

activate the plurality of SPSs and the VPS based on the indication of the plurality of SPSs and the VPS in the active parameter sets SEI message; and decode the video data of the access unit based on the plurality of activated SPSs and the activated VPS indicated in the active parameter sets SEI message.

9. The device of claim 8, wherein the active parameter sets SEI message precedes, in decoding order, a first portion of the video data of the access unit.

10. The device of claim 8, wherein the video decoder is configured to:

decode a num_sps_ids_minus1 syntax element as the first syntax element that specifies the number of the plurality of SPSs; and decode an active_sps_id[i] syntax elements for i=0; i≤num_sps_ids_minus1; i++ as the one or more additional syntax elements that comprise respective identifiers for each of the plurality of SPSs.

11. The device of claim 8, wherein the video data comprises at least one of a plurality of layers or a plurality of views, wherein each of the plurality of SPSs is associated with a respective one or more of the plurality of layers or plurality of views, and wherein, for each of the layers or views, the video decoder is configured to decode the video data of the layer or view based on the SPS associated with the layer or view.

12. The device of claim 11, wherein the video decoder is further configured to:

determine identifiers that are respectively associated with the plurality of layers or views, wherein determining the identifiers comprises at least one of:

decoding at least one of the identifiers, or deriving at least one of the identifiers based on a hierarchical position of the respective layer or view; and determine the plurality of SPSs for respectively decoding the video data of the plurality of layers or views based on the indication in the SEI message and the determined identifiers.

13. The device of claim 12, wherein each of the plurality of SPSs is associated with a respective one or more of the plurality of layers, and at least one of the plurality of SPSs comprises an active layer SPS.

14. The device of claim 12, wherein the video data comprises at least one of multiview video data, three-dimensional video data, or scalable video coding video data.

15. The device of claim 8, wherein the device comprises at least one of:

an integrated circuit implementing the video decoder;

a microprocessor implementing the video decoder; and a wireless communication device including the video decoder.

16. A device comprising:

means for storing video data;

means for coding a bitstream that includes the video data and syntax information for coding the video data, wherein the means for coding the syntax information comprises means for coding an active parameter sets supplemental enhancement information (SEI) message of an access unit, wherein the active parameter sets SEI message indicates a plurality of sequence parameter sets (SPSs) and a video parameter set (VPS) for coding video data of the access unit, and wherein the means for coding the active parameter sets SEI message comprises:

means for coding a first syntax element that specifies the number of the plurality of SPSs, and means for coding, based on the specified number of the plurality of SPSs, one or more additional syntax elements that comprise respective identifiers for each of the plurality of SPSs;

means for activating the plurality of SPSs and the VPS based on the indication of the plurality of SPSs and the VPS in the active parameter sets SEI message; and means for coding the video data of the access unit based on the plurality of activated SPSs and the activated VPS indicated in the active parameter sets SEI message.

17. The device of claim 16, wherein the video data comprises at least one of a plurality of layers or a plurality of views, wherein each of the plurality of SPSs is associated with a respective one or more of the plurality of layers or plurality of views, and wherein the means for coding the video data of the access unit based on the plurality of SPSs and the VPS comprises means for, for each of the layers or views, coding the video data of the layer or view based on the SPS associated with the layer or view.

18. The device of claim 17, wherein the video data comprises at least one of multiview video data, three-dimensional video data, or scalable video coding video data.

19. A non-transitory computer-readable storage medium having instructions stored thereon that, when executed by one or more processors of a video coder, cause the video coder to:

code a bitstream that includes video data and syntax information for coding the video data, wherein the instructions that cause the one or more processors to code the syntax information comprise instructions that cause the one or more processors to code an active parameter sets supplemental enhancement information (SEI) message of an access unit, wherein the active parameter sets SEI message indicates a plurality of sequence parameter sets (SPSs) and a video parameter set (VPS) for coding video data of the access unit, and wherein the instructions that cause the one or more processors to code the active parameter sets SEI message comprise instructions that cause the one or more processors to:

code a first syntax element that specifies the number of the plurality of SPSs, and code, based on the specified number of the plurality of SPSs, one or more additional syntax elements that comprise respective identifiers for each of the plurality of SPSs;

activate the plurality of SPSs and the VPS based on the indication of the plurality of SPSs and the VPS in the active parameter sets SEI message; and code the video data of the access unit based on the plurality of activated SPSs and the activated VPS indicated in the active parameter sets SEI message.

20. The computer-readable storage medium of claim 19, wherein the video data comprises at least one of a plurality of layers or a plurality of views, wherein each of the plurality of SPSs is associated with a respective one or more of the plurality of layers or plurality of views, and wherein the instructions that cause the one or more processors to code the video data of the access unit based on the plurality of SPSs and the VPS comprises instructions that cause the one or more processors to, for each of the layers or views, code the video data of the layer or view based on the SPS associated with the layer or view.

21. The computer-readable storage medium of claim 20, wherein the video data comprises at least one of multiview video data, three-dimensional video data, or scalable video coding video data.

* * * * *